United States Patent
Hashimoto et al.

(10) Patent No.: US 10,472,710 B2
(45) Date of Patent: Nov. 12, 2019

(54) ZN—AL—MG COATED STEEL SHEET, AND METHOD OF PRODUCING ZN—AL—MG COATED STEEL SHEET

(71) Applicant: NIPPON STEEL & SUMITOMO METAL CORPORATION, Tokyo (JP)

(72) Inventors: Shigeru Hashimoto, Tokyo (JP); Makoto Nakazawa, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 154 days.

(21) Appl. No.: 15/554,451

(22) PCT Filed: Apr. 8, 2015

(86) PCT No.: PCT/JP2015/061020
§ 371 (c)(1),
(2) Date: Aug. 30, 2017

(87) PCT Pub. No.: WO2016/162982
PCT Pub. Date: Oct. 13, 2016

(65) Prior Publication Data
US 2018/0237897 A1 Aug. 23, 2018

(51) Int. Cl.
*C23C 2/06* (2006.01)
*C23C 2/28* (2006.01)
(Continued)

(52) U.S. Cl.
CPC ............... *C23C 2/06* (2013.01); *B32B 15/01* (2013.01); *B32B 15/012* (2013.01);
(Continued)

(58) Field of Classification Search
CPC .... C23C 2/06; C23C 2/12; C23C 2/28; C23C 30/00; C23C 30/005; C23C 2/40;
(Continued)

(56) References Cited

U.S. PATENT DOCUMENTS 6,709,770 B2 * 3/2004 Komatsu .................. C23C 2/06
428/659
2003/0003321 A1 1/2003 Sugimaru et al.
(Continued)

FOREIGN PATENT DOCUMENTS

JP 10-226865 A 8/1998
JP 10-265926 * 10/1998
(Continued)

OTHER PUBLICATIONS

Machine Translation, Takao et al., JP 10-265926, Oct. 1998. (Year: 1998).*
(Continued)

*Primary Examiner* — Michael E. La Villa
(74) *Attorney, Agent, or Firm* — Birch, Stewart, Kolasch & Birch, LLP

(57) ABSTRACT

Provided is a Zn—A—Mg coated steel sheet having a plated layer including from 4 to 22% by mass of Al, from 1.0 to 6.5% by mass of Mg, from 0.001 to 1.000% by mass of Si, as well as Zn and impurities as the balance, wherein the structure of the plated layer contains an Al primary crystal, the Al primary crystal including: a cellular dendrite-shaped first Al primary crystal and a second axis spacing of from 0.5 to 2.0 μm; a minute equi-axed dendrite-shaped second Al primary crystal and a second axis spacing of from 0.5 to 2.0 μm; and a petal-shaped third Al primary crystal with a principal axis length of from 0.5 to 3.0 μm and a ternary eutectic structure of Al, Zn, and $Mg_2Zn_{11}$ as a structure other than the Al primary crystal.

5 Claims, 11 Drawing Sheets

(51) Int. Cl.
| | |
|---|---|
| *C21D 9/46* | (2006.01) |
| *C22C 18/04* | (2006.01) |
| *B32B 15/01* | (2006.01) |
| *C23C 30/00* | (2006.01) |
| *B32B 15/18* | (2006.01) |
| *B32B 15/04* | (2006.01) |
| *C22C 18/00* | (2006.01) |
| *B32B 15/20* | (2006.01) |
| *C23C 2/12* | (2006.01) |
| *C23C 2/40* | (2006.01) |

(52) U.S. Cl.
CPC ............ *B32B 15/017* (2013.01); *B32B 15/04* (2013.01); *B32B 15/043* (2013.01); *B32B 15/18* (2013.01); *B32B 15/20* (2013.01); *C21D 9/46* (2013.01); *C22C 18/00* (2013.01); *C22C 18/04* (2013.01); *C23C 2/12* (2013.01); *C23C 2/28* (2013.01); *C23C 2/40* (2013.01); *C23C 30/00* (2013.01); *C23C 30/005* (2013.01); *Y10T 428/12757* (2015.01); *Y10T 428/12799* (2015.01); *Y10T 428/12951* (2015.01); *Y10T 428/12958* (2015.01); *Y10T 428/12972* (2015.01); *Y10T 428/12979* (2015.01)

(58) Field of Classification Search
CPC ........... C22C 18/04; C22C 18/00; C21D 9/46; B32B 15/01; B32B 15/012; B32B 15/017; B32B 15/04; B32B 15/043; B32B 15/18; B32B 15/20; Y10T 428/12799; Y10T 428/12757; Y10T 428/12958; Y10T 428/12951; Y10T 428/12972; Y10T 428/12979
See application file for complete search history.

(56) References Cited

U.S. PATENT DOCUMENTS

| | | |
|---|---|---|
| 2009/0053555 A1 | 2/2009 | Nose et al. |
| 2009/0199934 A1 | 8/2009 | Liu et al. |
| 2013/0337287 A1 | 12/2013 | Hirata et al. |

FOREIGN PATENT DOCUMENTS

| | | |
|---|---|---|
| JP | 10-265926 A | 10/1998 |
| JP | 2001-20050 A | 1/2001 |
| JP | 2002-30405 A | 1/2002 |
| JP | 2002-47521 A | 2/2002 |
| JP | 2002-47548 A | 2/2002 |
| JP | 2002-47549 A | 2/2002 |
| JP | 2002-275611 A | 9/2002 |
| JP | 2003-147500 A | 5/2003 |
| JP | 2004-68075 A | 3/2004 |
| JP | 3735360 B2 | 1/2006 |
| JP | 2006-283155 A | 10/2006 |
| JP | 2009-537701 A | 10/2009 |
| JP | 2010-100897 A | 5/2010 |
| JP | 5200851 B2 | 6/2013 |
| WO | WO 2007/108496 A1 | 9/2007 |
| WO | WO 2011/001662 A1 | 1/2011 |

OTHER PUBLICATIONS

Indian Office Action dated Feb. 12, 2019 for corresponding Indian Patent Application No. 201717030513, with English Translation.
International Search Report, issued in PCT/JP2015/061020, PCT/ISA/210, dated Jul. 7, 2015.
Written Opinion of the International Searching Authority, issued in PCT/JP2015/061020, PCT/ISA/237, dated Jul. 7, 2015.

* cited by examiner

[Fig. 1]
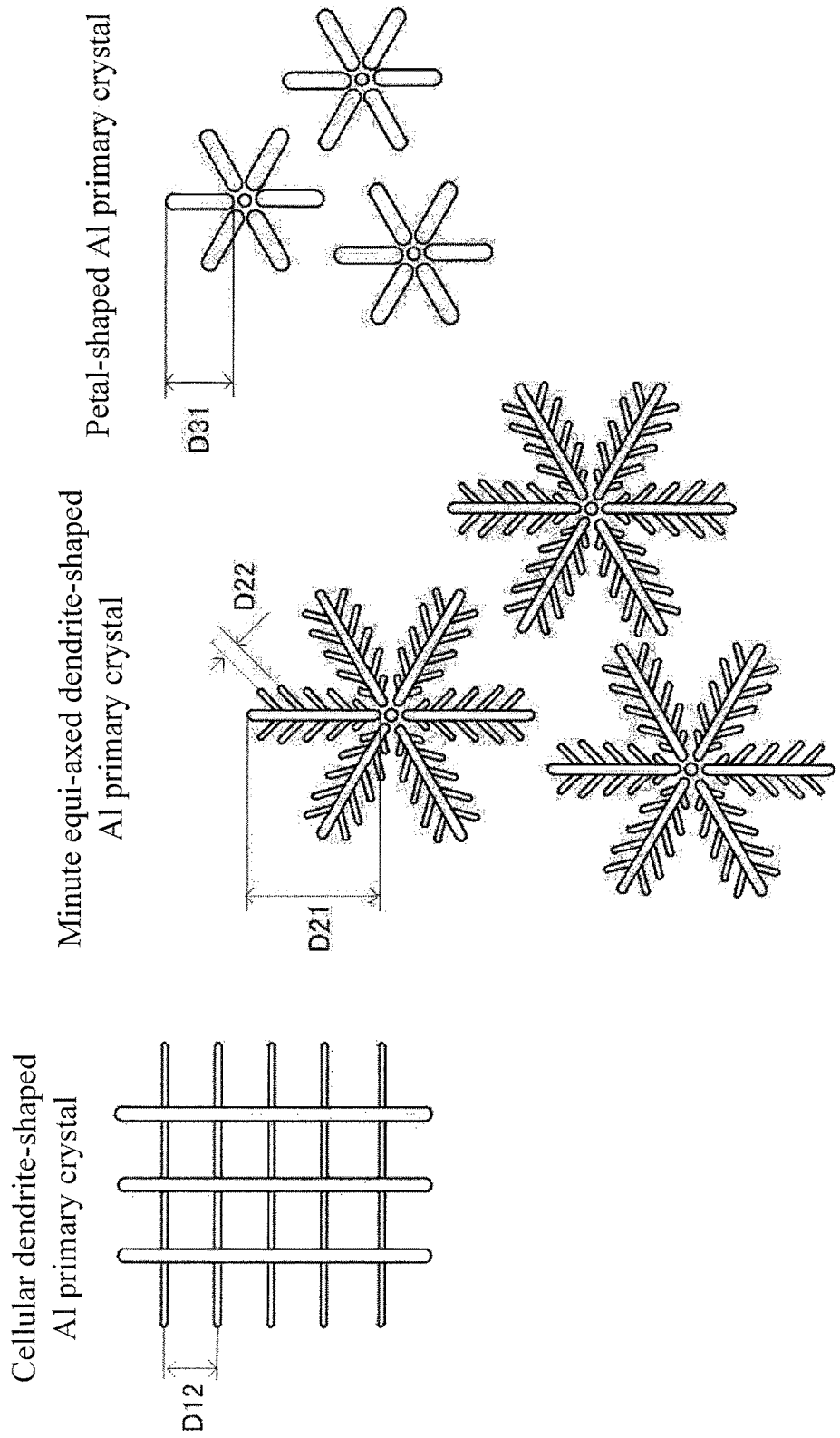

[Fig. 2]
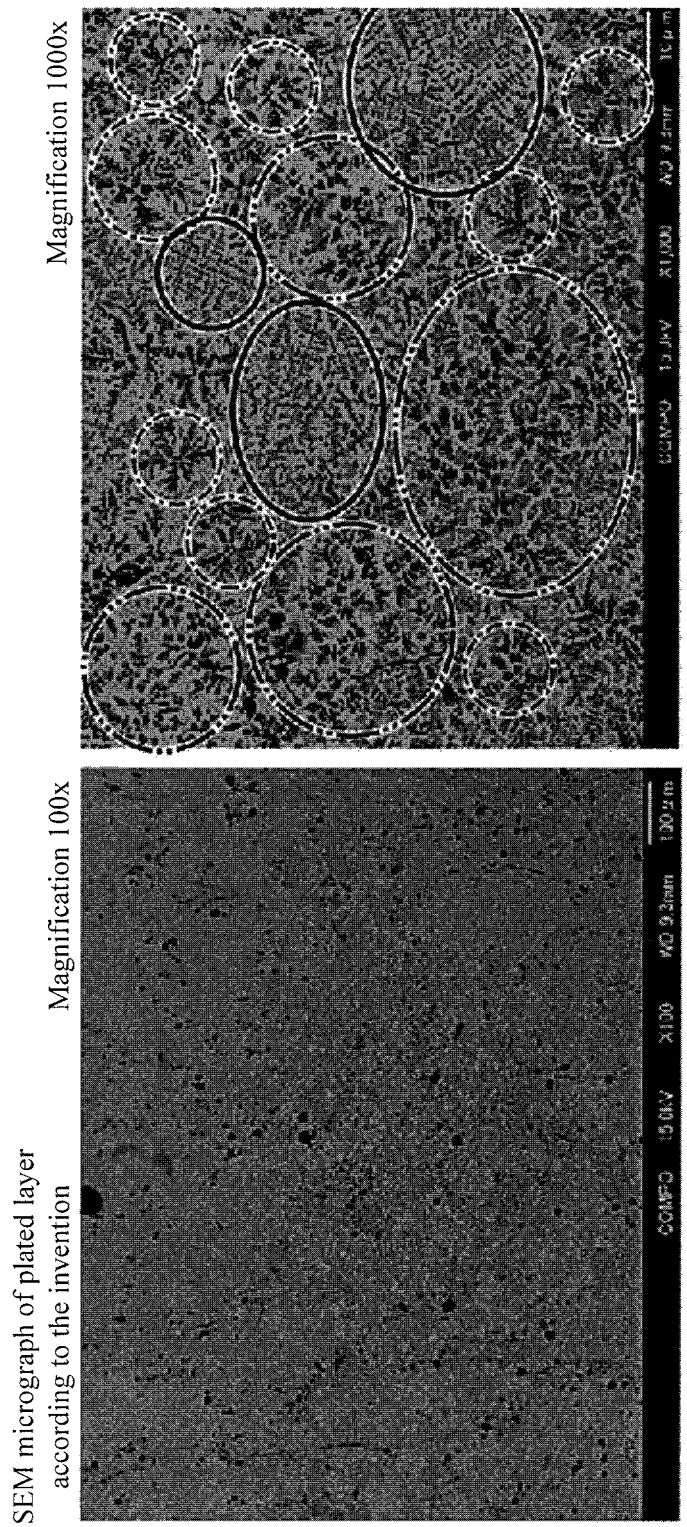

[Fig. 3]
SEM micrograph of plated layer according to the invention
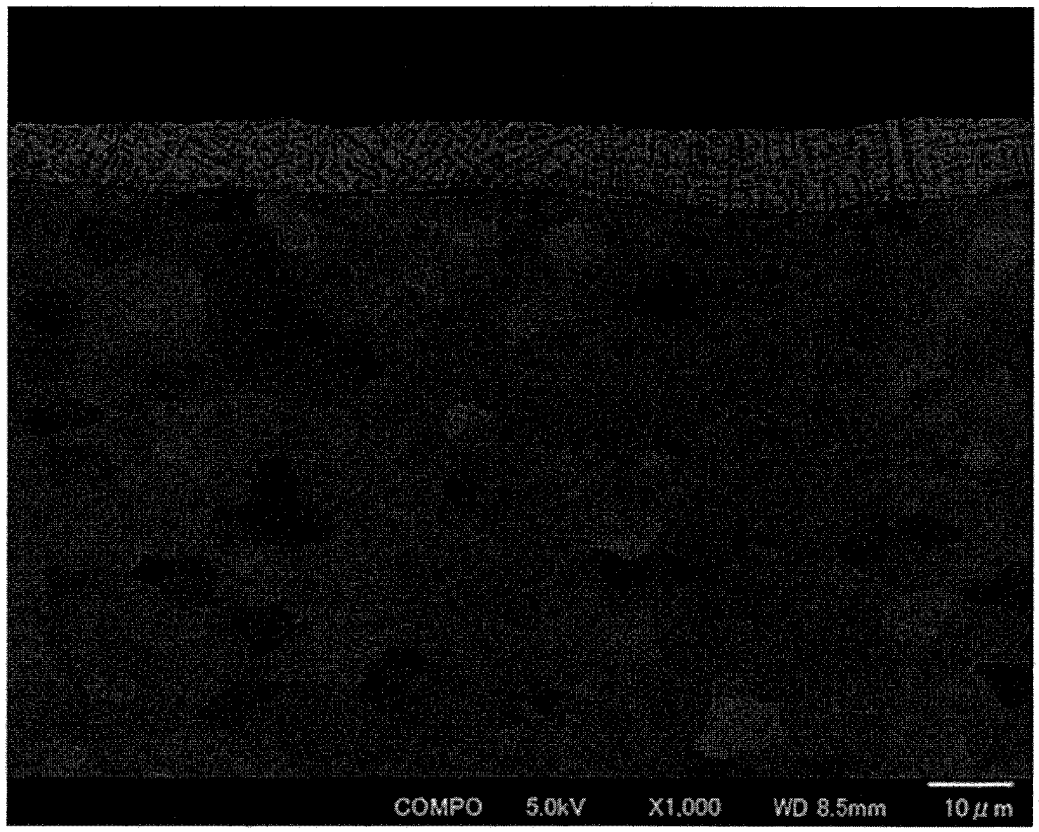

[Fig. 4]
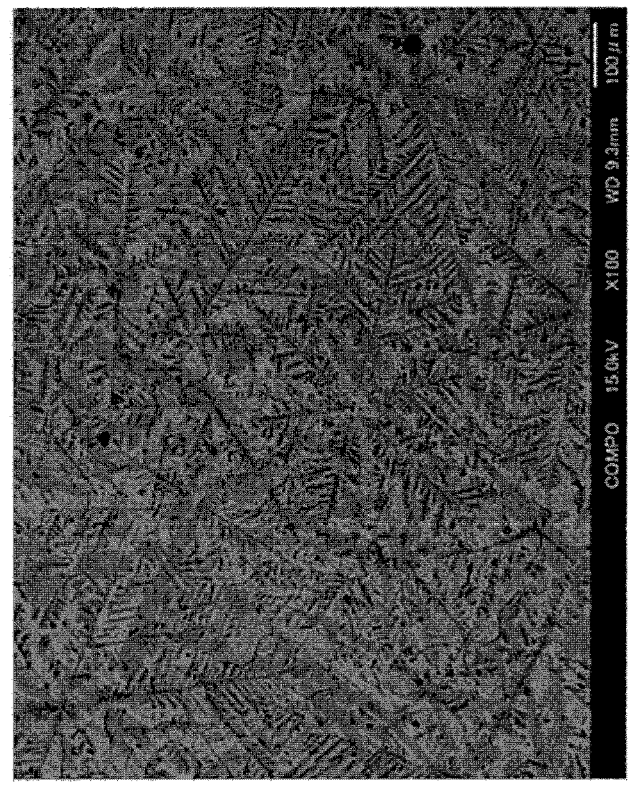
SEM micrograph of plated layer of Comparative Example

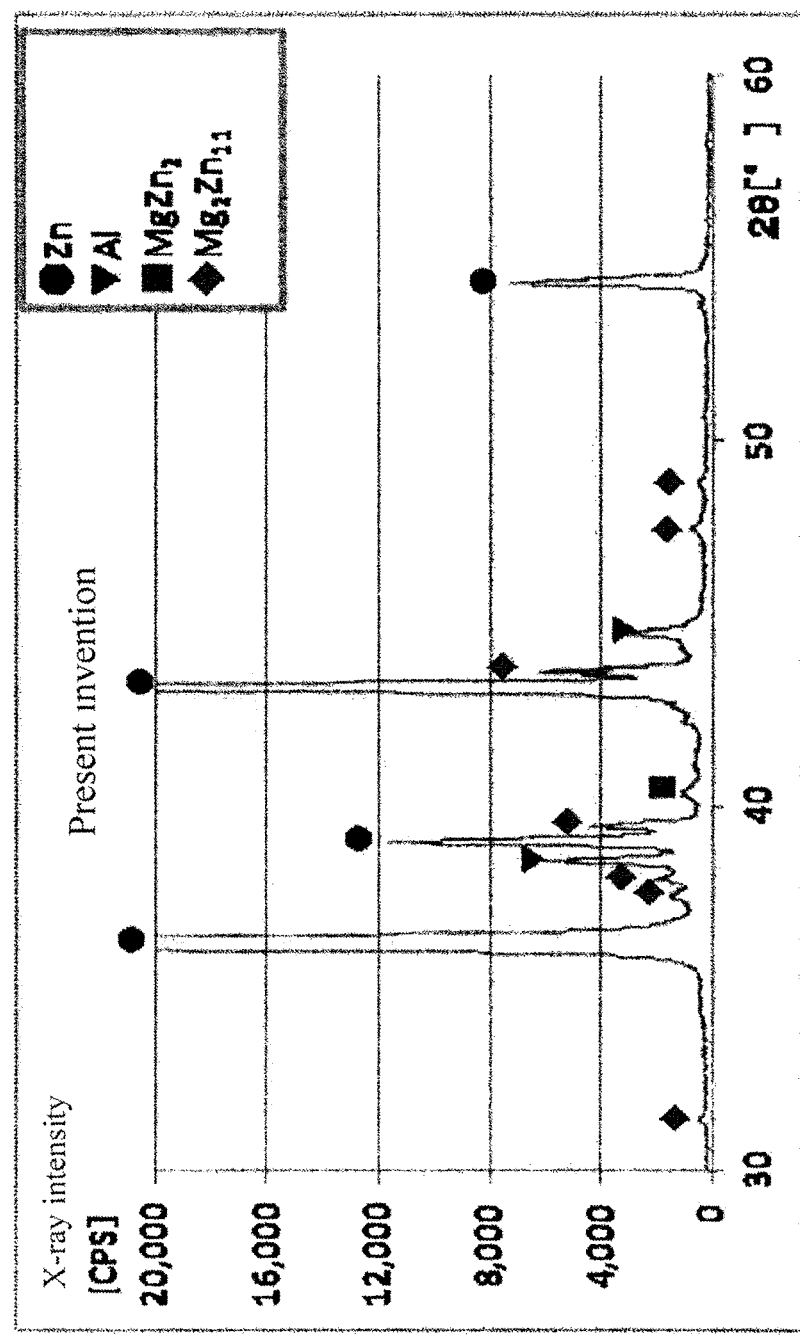
[Fig. 5A]

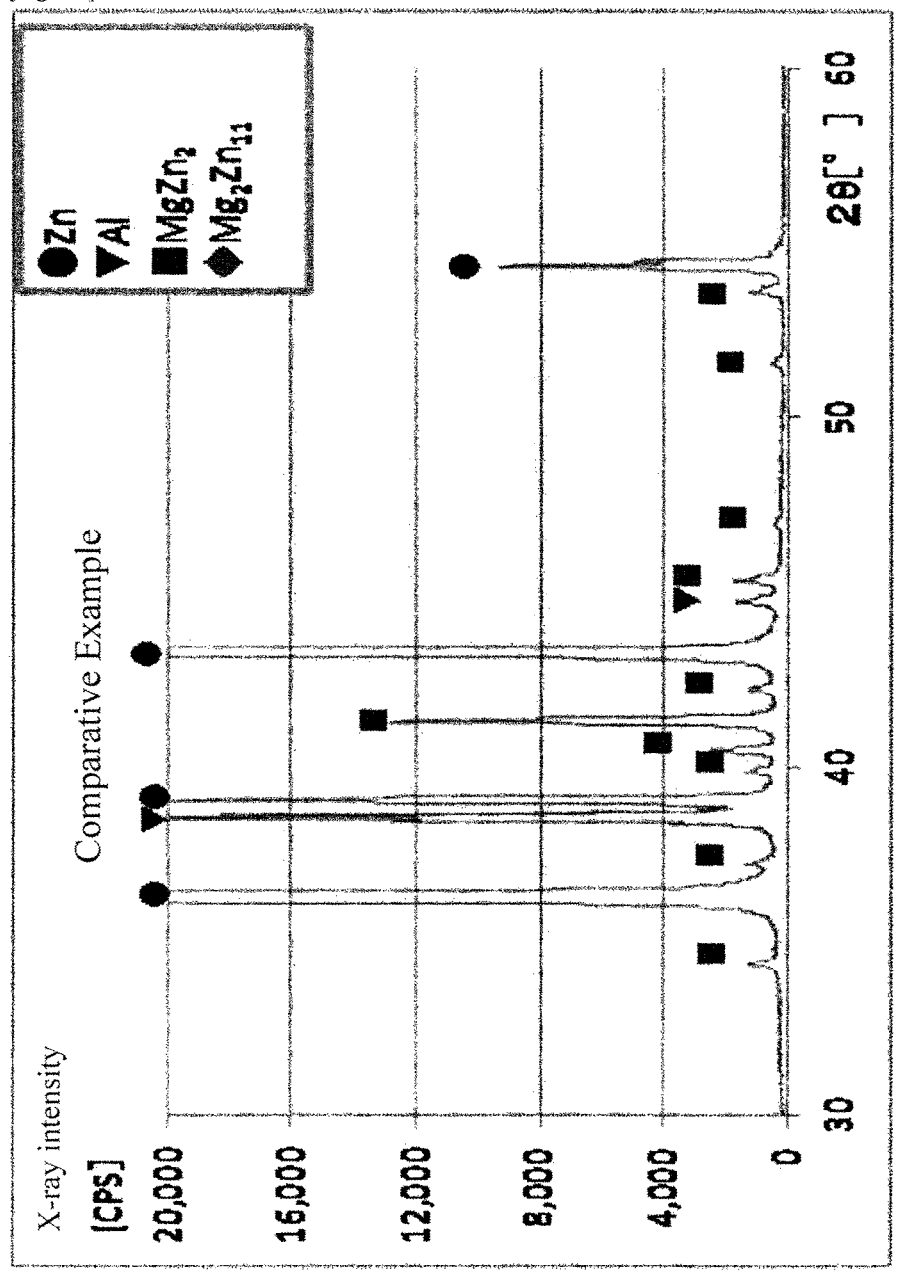

[Fig. 6]
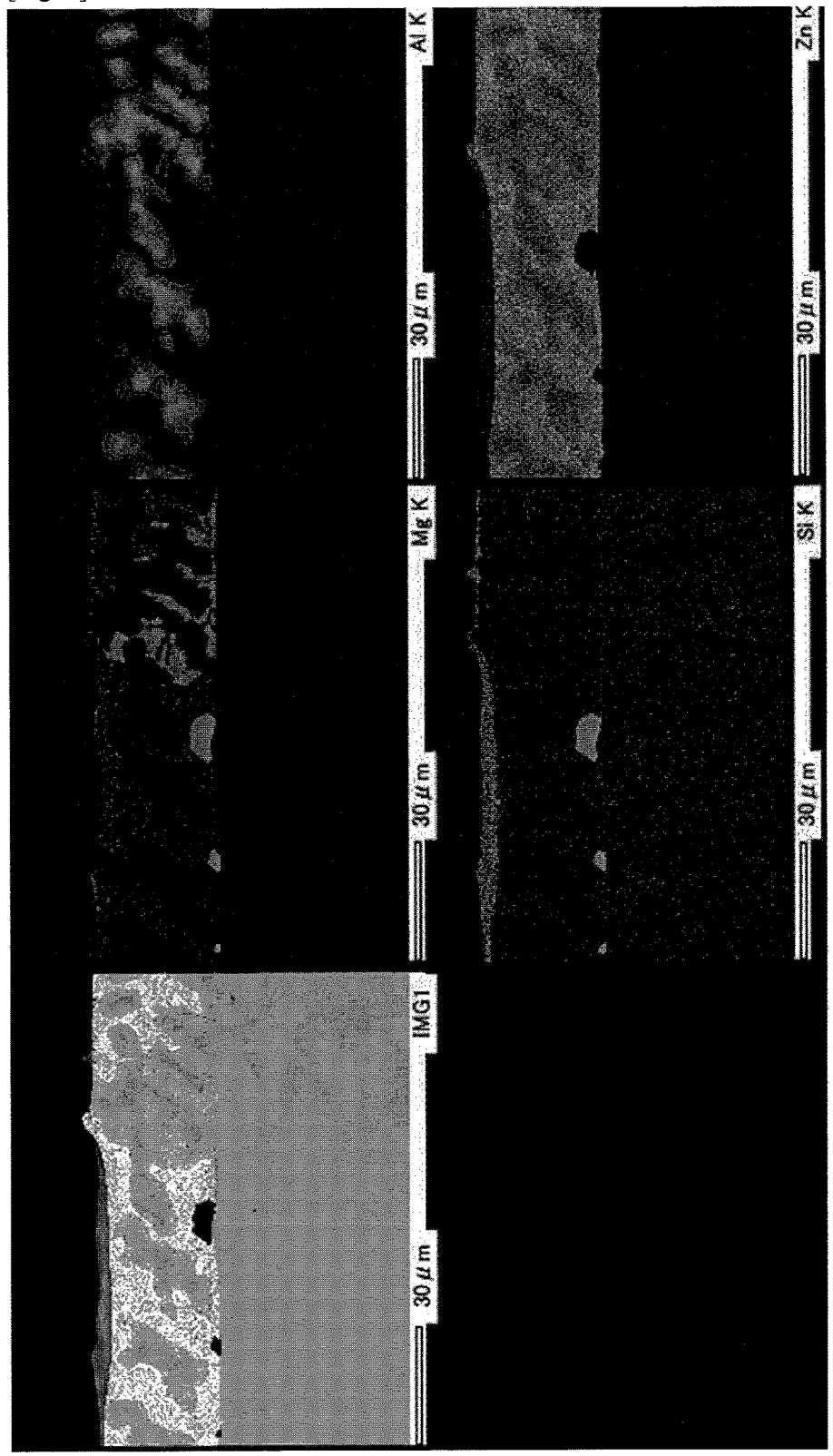

[Fig. 7]
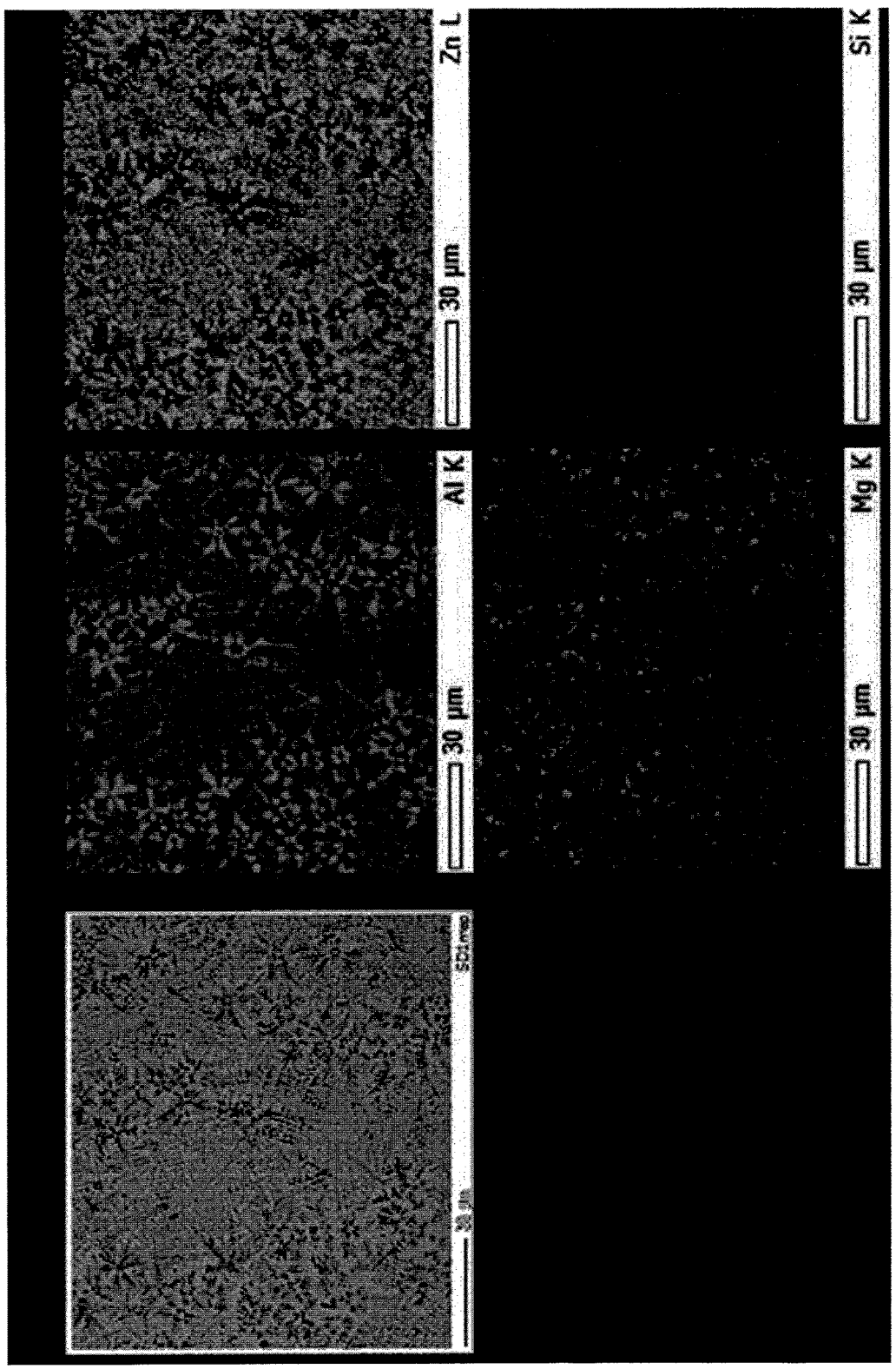

[Fig. 8]
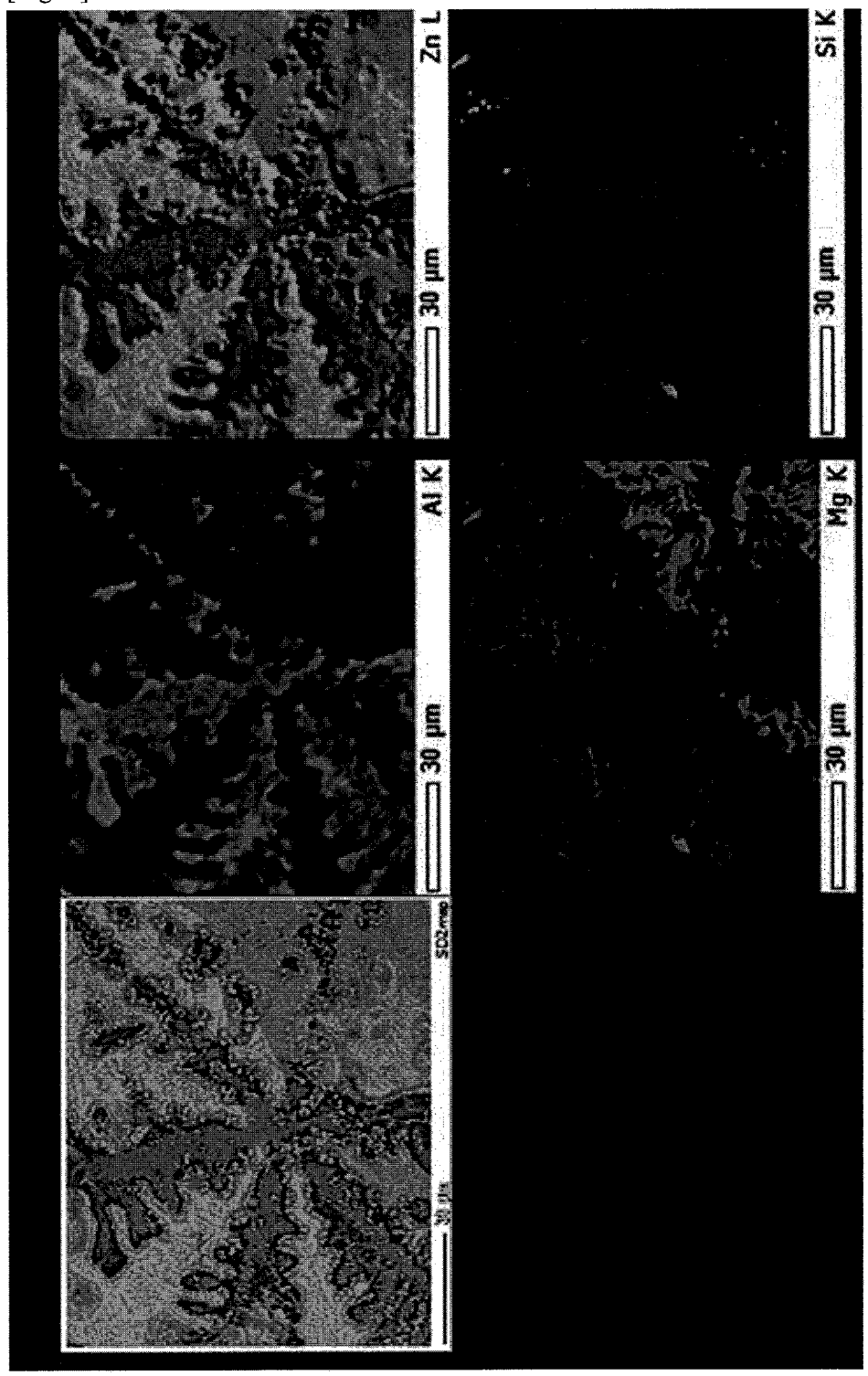

[Fig. 9A]
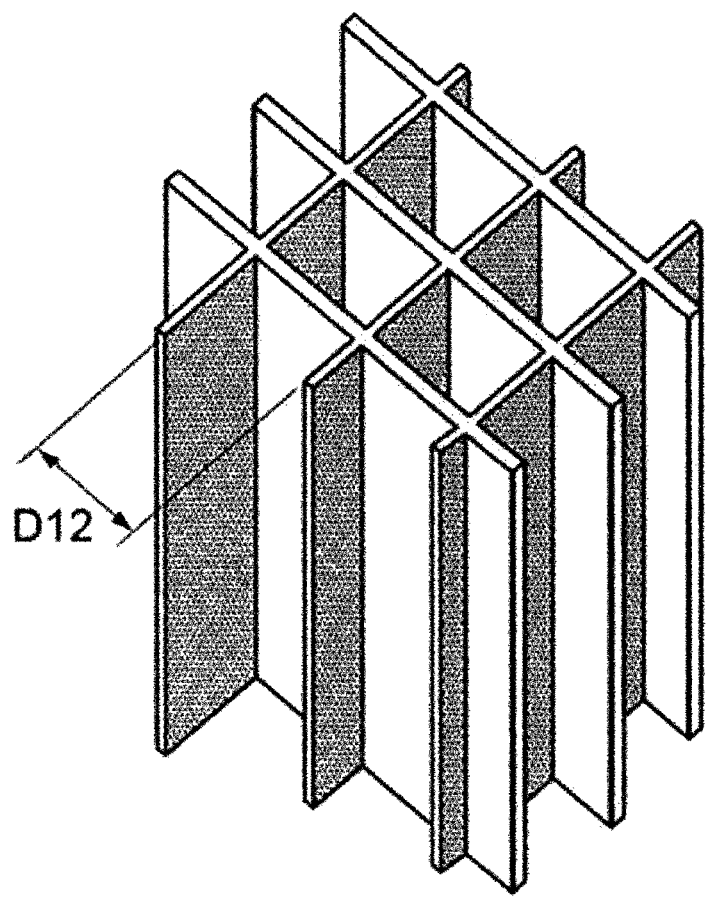

[Fig. 9B]
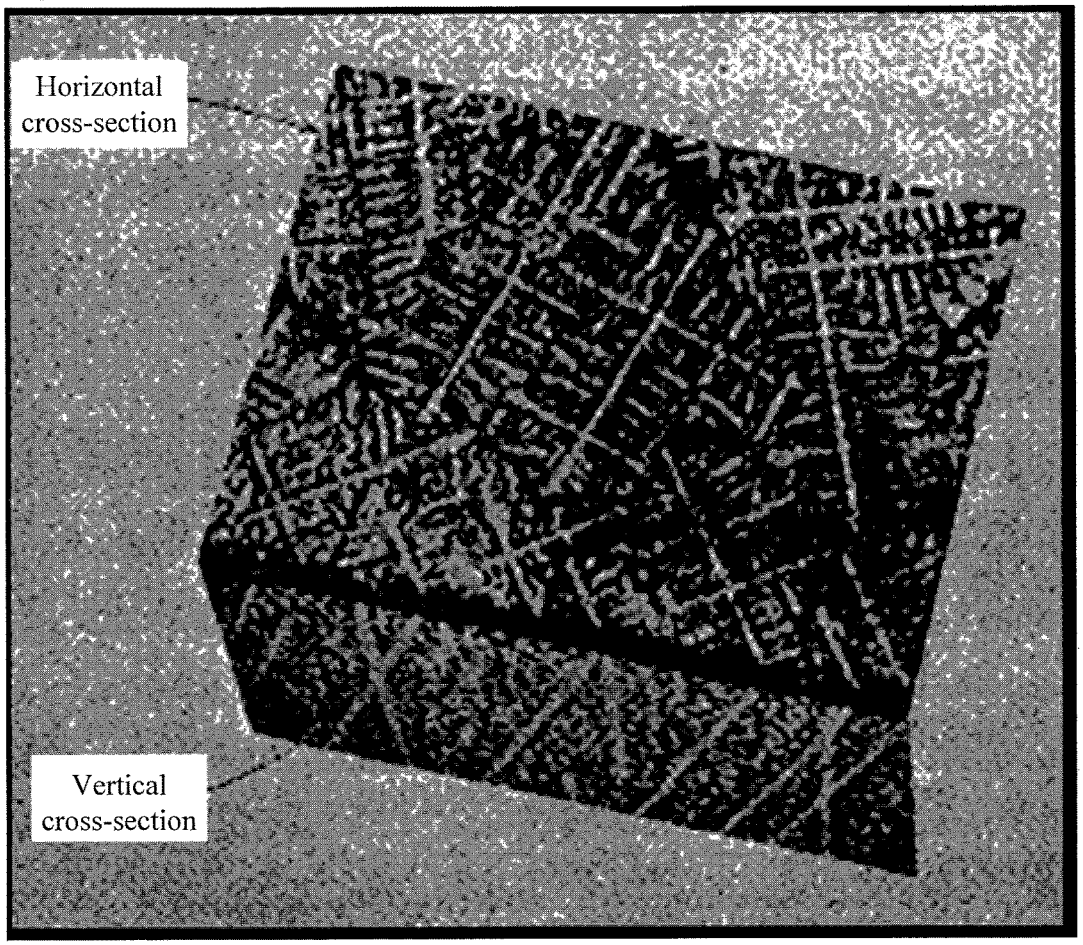

ZN—AL—MG COATED STEEL SHEET, AND METHOD OF PRODUCING ZN—AL—MG COATED STEEL SHEET

TECHNICAL FIELD

The present invention relates to a Zn—A—Mg coated steel sheet, and a method of producing a Zn—A—Mg coated steel sheet

BACKGROUND ART

For household electrical appliances and building materials, a hot-dip plated steel sheet with a plating composition containing Zn, Al, and Mg as main components, to which, if necessary, an addition element such as Si is added, has been broadly used or proposed. Such plating exhibits superior corrosion resistance compared to Zn plating or Al plating owing to an alloy element.

In recent years, innovations, such as control of a particle size by optimization of a bath composition, control of a particle size by a cooling method, etc., control of existence form through different pretreatments for plating, and rationalization of a phase by regulation of a cooling method, have been added in order to improve corrosion resistance or consistent appearance For example, the following Patent Literature 1 discloses an invention concerning a hot-dip Zn—A—Mg coated steel material, in which plated layer one or two single phases out of $MgZn_2$, or $Mg_2Zn_{11}$ are precipitated in a particle size of 0.5 μm or more, and which is superior in corrosion resistance at an unpainted processed part and a painted edge.

This invention has made clear the existence form of Mg superior in corrosion resistance. Specifically, it demonstrates that for improvement of corrosion resistance Mg should preferably be present independently in a plated layer forming a single phase of $MgZn_2$ or $Mg_2Zn_{11}$ in a particle size of 0.5 μm or more, rather than distributed minutely in a ternary eutectic in a form of an intermetallic compound.

The following Patent Literature 2 discloses an invention concerning a hot-dip zinc-coated steel sheet, in which plated layer one or two out of an Al phase, a Zn phase, $MgZn_2$, or $Mg_2Zn_{11}$ in a form of granular crystallites with a size of 0.3 μm or less are dispersed, and which is superior in corrosion resistance after working.

This invention alleges that working cracks can be decreased and the corrosion resistance after working can be superior because a constitution in which crystallites of the phase and the compound with an average particle diameter of 0.3 μm or less is dispersed randomly is formed due to a cooling condition of from 40 to 100° C./sec.

The following Patent Literature 3 discloses an invention concerning a Zn—A—Mg coated steel sheet having a plated layer on at least one side of the steel sheet, wherein a Mg—Zn compound contained in the plated layer does not exist as an aggregate, and grows from the vicinity of an interface between the plated layer and a steel matrix toward the superficial layer of the plated layer in a columnar shape to exist in a columnar shape exposing to the surface of the plated layer such that the exposed area occupies from 15 to 60% of the surface of the plated layer.

This invention alleges that by growing a Mg—Zn compound in a columnar shape by performing Ni plating, etc. as a pretreatment, so as to dissolve the Mg—Zn compound gradually at a constant rate from the initial stage of corrosion until complete depletion of the whole plating, an appropriate amount of Mg contributing to corrosion protection may be supplied to the plating surface. This effect has been confirmed by stable corrosion resistance in a wet-dry cyclic environment.

The following Patent Literature 4 discloses an invention concerning a technology, by which water or an aqueous solution is sprayed in a form of droplets over the whole area of an unsolidified plated layer from the initiation of solidification of Zn—A—Mg plating until the end of the same in order to improve uneven appearance caused by intermingled crystallization of a $MgZn_2$ phase and a $Mg_2Zn_{11}$ phase during solidification.

This invention alleges that even appearance is obtained owing to presence of a metal structure of an Al primary crystal or a mixture of an Al primary crystal and a Zn single phase in a base of an $Al/Zn/Mg_2Zn_{11}$ ternary eutectic structure owing to the spray cooling.

The following Patent Literature 5 discloses a hot-dip plated steel sheet having excellent appearance characterized in that 60% or more of crystals with a ternary eutectic structure of an Al/Zn/MgZn alloy in a plated layer per unit area have an equivalent circle diameter of 100 μm or more.

This invention alleges that defective appearance may be prevented by suppressing formation of a $Mg_2Zn_{11}$ phase by controlling a cooling condition so as to minimize a supercooled part.

Further, various disclosures have been made also by the following Patent Literature 6 to 12 with respect to the structure of a plated layer of a Zn—A—Mg coated steel sheet.

Patent Literature 1: Japanese Patent Application Laid-Open (JP-A) No. 2001-20050
Patent Literature 2: JP-A No. 2003-147500
Patent Literature 3: JP-A No. 2010-100897
Patent Literature 4: JP-A No. H10-265926
Patent Literature 5: JP-A No. 2006-283155
Patent Literature 6: International Publication No. WO 2007/108496
Patent Literature 7: JP-A No. 2004-68075
Patent Literature 8: JP-A No. H10-265926
Patent Literature 9: JP-A No. H10-226865
Patent Literature 10: JP-A No. 2002-047549
Patent Literature 11: JP-A No. 2002-047548
Patent Literature 12: JP-A No. 2002-030405

SUMMARY OF INVENTION

Technical Problem

However, such conventional art has the following problems.

For example, Patent Literature 1 and Patent Literature 2 have defined requirements on the particle size of a product. Patent Literature 1 describes in Description that the corrosion resistance is remarkably improved owing to a stabilizing effect on a corrosion product of zinc by high concentration Mg established by existence of $MgZn_2$ or $Mg_2Zn_{11}$ with a particle size of 0.5 μm or more as a "single phase" by designation of a plating composition range, and that a cooling rate should better be slow. Meanwhile, Patent Literature 2 describes that a working crack does not occur and the corrosion resistance after working can be superior by cooling at 40° C./sec or more through a range of a solidifying point ±20° C. so as to disperse all of an Al phase, a Zn phase, $MgZn_2$, and $Mg_2Zn_{11}$ in a plated layer at a particle size of 0.3 μm or less, however further improvement of corrosion resistance is more preferable.

In Patent Literature 1 and Patent Literature 2, designated ranges of a particle size are different greatly, and there is no common portion concerning production conditions. According to Patent Literature 1, a Mg—Zn alloy containing Mg with strong anticorrosion function at a high concentration is actively generated and grown such that the anticorrosion function itself is enhanced. Meanwhile, according to Patent Literature 2, a method of preventing extreme deterioration of corrosion resistance by preventing physical cracking, etc. during working on a plated layer by avoiding coexistence of particles having a different shape or hardness is described.

Therefore, the respective merits become problems from other viewpoints. Namely, according to Patent Literature 1, when a structure of a single phase is grown, the difference in physical properties with a remaining phase becomes large and therefore there arises a problem that working cracks may easily occur. Namely, it is a material which is very difficult to use for a processed product including a household electrical appliance, such as a refrigerator, an air conditioner, and a video device, and a building material, such as a support for outdoor equipment, a building exterior wall, and a cable rack. Meanwhile, it is a problem of Patent Literature 2 that average corrosion resistance is sacrificed.

Patent Literature 3 presents an example of a control of an existence form of a compound changed by difference in a plating pretreatment. For forming a very special structural constitution, in which a columnar crystal of a Zn—Mg phase is grown from a plating-steel matrix interface in the vertical direction (toward a surface) to reach the surface (ordinarily a crystal grows horizontally), it is necessary that Ni plating is formed by electroplating on a surface of a steel sheet as a pretreatment, the steel sheet is subjected to a dipping treatment in an aqueous acid solution, then heated at a temperature not alloying with a steel matrix (500° C. or less) in a non-oxidation or reducing atmosphere, and then plating is applied. In an ordinary plating line, there is an annealing oven (maximum temperature approximately 800° C.) for preparing a material at an initial stage of a process, and therefore the above special condition cannot be realized in such a line. As for corrosion resistance, a corrosion weight loss (JASO test) equivalent to the present invention is exhibited. Since the equipment cost and operating expenses for Ni plating as a pretreatment are high, Ni plating is hardly applicable to inexpensive applications such as a household electrical appliance, and a building material.

Further, according to Patent Literature 3 a columnar crystal is generated after Ni plating is applied. It is described that when Ni plating is less than a predetermined quantity, a columnar crystal is not generated and the corrosion resistance becomes inferior. Without Ni plating, it has conceivably corrosion resistance equivalent to Patent Literature 1.

Patent Literature 4 and Patent Literature 5 present as an example a method by which the appearance is improved by optimization of a phase by controlling a cooling method. With respect to the method Patent Literature 4 describes that only $Mg_2Zn_{11}$ is generated as a MgZn alloy in an Al/Zn/MgZn alloy (ternary eutectic) by quenching with a spray of water or an aqueous solution. As a general liquid spray method including for a plating process, there are a gas-liquid nozzle, by which a liquid is entrained in a gas jet flow, and a liquid nozzle, by which a liquid is pressurized to be blown as a mist. In both cases a large number of nozzles are used, such that a large number of droplets dispersed in a range with an oval (including circular) cross-section for each nozzle collide with a steel sheet to cause heat exchange and chill the steel sheet. It has been known that there appears a water quantity density distribution in an oval spray range, and a water quantity density difference between a nozzle region and an internozzle region. Therefore, even if uniformity in a width range of 1 μm is secured, it is difficult to secure the same cooling condition in a range of from 0.5 to 2 m, which is a common sheet width in a plating process. Further, due to a risk of nozzle clogging, etc. the facility comes to incur a high maintenance load. In some cases, a liquid, or a gas+liquid is sprayed using a high pressure to cover up the ununiformity. In this case, if the pressure is higher than the same for wiping, which determines the coating weight, the shape ununiformity may become problematic.

Although according to Patent Literature 4, a Mg—Zn alloy ($Mg_2Zn_{11}$) is formed in a ternary eutectic similar to the present invention, improvement of the appearance is achieved by cooling with a spray of water or an aqueous solution as a means for improving an appearance. There is not a description concerning corrosion resistance, however, since the cooling rate is low (in Examples, maximum 20 degree/sec), it is conceivably at a level of general Mg—Zn—Al plating.

Meanwhile, Patent Literature 5 focuses on inhibition of $Mg_2Zn_{11}$ to be generated by supercooling by performing secondary cooling conversely at a slow rate, and therefore working crack is prone to occur due to difference in physical properties among a plurality of phases similar to the case of Patent Literature 1, and therefore the corrosion resistance is impaired with high possibility. There is not a description concerning corrosion resistance, however, since the cooling rate is further lower, it is conceivably at a level of general Mg—Zn—Al plating.

Although in Patent Literature 6 to 12, the corrosion resistance of Zn—A—Mg plating is also investigated, in the present situation further improvement is required.

The present invention was made in view of such problems. An object of the invention is provide a Zn—A—Mg coated steel sheet, which uses a conventional composition, but is constituted with a fine crystalline structure, which is superior in corrosion resistance and processability, compared to conventional products as represented by the above Patent Literature 1 to 2, and 4 to 12, and which corrosion resistance may be stably maintained, as well as a method of producing a Zn—A—Mg coated steel sheet. Another object is to provide a Zn—A—Mg coated steel sheet, which can achieve corrosion resistance equivalent to the corrosion resistance obtained by a special pretreatment and facility configuration according to the above Patent Literature 3, by a general line configuration, and which corrosion resistance may be stably maintained, as well as a method of producing a Zn—A—Mg coated steel sheet.

Solution to Problem

The inventors investigated relationships between a production condition for a plated layer, a solidified structure, and a product, and corrosion resistance to find a Zn—A—Mg coated steel sheet, which has superior corrosion resistance improved from conventional corrosion resistance, and which corrosion resistance may be stably maintained, as well as a method of producing a Zn—A—Mg coated steel sheet.

The invention was completed based on the above findings and the essentials of the invention are as follows.

(1) A Zn—A—Mg coated steel sheet, comprising a plated layer comprising from 4 to 22% by mass of Al, from 1.0 to 6.5% by mass of Mg wherein Mg is ½ or less of Al in terms of % by mass, from 0.001 to 1.000% by mass of Si, and Zn and impurities as the balance, wherein the structure of the plated layer comprises:

an Al primary crystal, the Al primary crystal comprising: a cellular dendrite-shaped first Al primary crystal with an area rate of from 30 to 70% and a second axis spacing of from 0.5 to 2.0 μm; a minute equi-axed dendrite-shaped second Al primary crystal with a principal axis length of from 5 to 10 μm and a second axis spacing of from 0.5 to 2.0 μm; and a petal-shaped third Al primary crystal with a principal axis length of from 0.5 to 3.0 μm, wherein a total area rate of the minute equi-axed dendrite-shaped second Al primary crystal and the petal-shaped third Al primary crystal is from 30 to 70%; and a ternary eutectic structure of Al, Zn, and $Mg_2Zn_{11}$ as a structure other than the Al primary crystal.

(2) The Zn—A—Mg coated steel sheet according to (1) above, wherein the plated layer further includes one, or more selected from Ti, Nb, Fe, Ni, Cr, Sn, Mn, and B, singly or as a complex in a total amount of from 0.0001 to 1.0000% by mass.

(3) The Zn—A—Mg coated steel sheet according to (1) or (2) above, wherein the structure of the plated layer does not include $Mg_2Si$.

(4) A method of producing a Zn—A—Mg coated steel sheet, the method comprising:

plating, on at least one side of a steel sheet, molten zinc including from 4 to 22% by mass of Al, from 1.0 to 6.5% by mass of Mg wherein Mg is ½ or less of Al in terms of % by mass, from 0.001 to 1.000% by mass of Si, and Zn and impurities as the balance, and heating the steel sheet plated with the molten zinc to a temperature from 30° C. higher than a solidification initiation temperature of an Al primary crystal to 520° C., and then cooling from the temperature to a temperature of 370° C. at a cooling rate of 500° C./sec or more, and securing an overall heat-transfer coefficient during cooling of from 1000 to 3000 $W/(m^2 \cdot K)$.

(5) The method of producing a Zn—A—Mg coated steel sheet according to (4) above, wherein the cooling is performed by water immersion cooling.

Advantageous Effects of Invention

The present invention is able to provide a Zn—A—Mg coated steel sheet, which is superior in corrosion resistance, and able to maintain stably the corrosion resistance as well as a method of producing a Zn—A—Mg coated steel sheet. When a coated steel sheet according to the invention is used in household electrical appliances, and building materials, products with durability for long-term use may be obtained.

BRIEF DESCRIPTION OF DRAWINGS

FIG. 1 is a schematic plan view showing the shapes of an Al primary crystal in a plated layer of a Zn—A—Mg coated steel sheet according to the invention.

FIG. 2 is SEM micrographs of a plated layer of a Zn—A—Mg coated steel sheet according to the invention observed from the surface.

FIG. 3 is an SEM micrograph observing a cross-section of a plated layer of a Zn—A—Mg coated steel sheet according to the invention.

FIG. 4 is SEM micrographs of a plated layer of a Zn—A—Mg coated steel sheet according to a Comparative Example observed from the surface.

FIG. 5A is a chart showing the intensity of an X-ray diffraction spectrum of a plated layer of a Zn—A—Mg coated steel sheet according to the invention (coated steel sheet produced in Example)

FIG. 5B is a chart showing the intensity of an X-ray diffraction spectrum of a plated layer of a Zn—A—Mg coated steel sheet according to a Comparative Example (coated steel sheet (10) produced in Example)

FIG. 6 is figures showing analytical results of a component element distribution at a cross-section of a plated layer of a Zn—A—Mg coated steel sheet according to a Comparative Example.

FIG. 7 is figures showing analytical results of a component element distribution at a surface of a plated layer of a Zn—A—Mg coated steel sheet according to the invention.

FIG. 8 is figures showing analytical results of a component element distribution at a surface of a plated layer of a Zn—A—Mg coated steel sheet according to a Comparative Example.

FIG. 9A is a schematic perspective view showing the shape of a cellular dendrite-shaped Al primary crystal.

FIG. 9B is a photograph observing a cellular dendrite-shaped Al primary crystal (Citation: a photograph by T. Bower in "B. Chalmers, Principles of Solidification (1964)", p. 165).

DESCRIPTION OF EMBODIMENTS

The invention will be described in detail below.

The inventors have made investigation concerning a Zn—A—Mg coated steel sheet taking into consideration component elements of a plated layer, a cooling method, etc. from the viewpoint of improvement of uniformity of a solidified structure. As the result, it has been found that it is important to produce a structure of a plated layer superior in corrosion resistance and able to maintain stably the corrosion resistance by satisfying: 1) there are minute Al primary crystals with heretofore not known different shapes of a solidified structure at certain contents or higher, and 2) a structure other than an Al primary crystal is constituted with a predetermined ternary eutectic structure. Based on the above, a coated steel sheet according to the invention, which is superior in corrosion resistance and able to maintain stably the corrosion resistance, has been completed.

(Component Elements of Zn—A—Mg Plated Layer)

Firstly, the component elements of a Zn—A—Mg plated layer as an object of the invention will be described.

A plated layer is based on Zn and its corrosion resistance is enhanced by adding Al, and Mg. Further, a plated layer is improved in terms of adherence between the plated layer and a steel sheet by adding Si.

Specifically, a plated layer contains from 4 to 22% by mass of Al, from 1.0 to 6.5% by mass of Mg wherein Mg is ½ or less of Al in terms of % by mass, from 0.001 to 1.000% by mass of Si, and Zn and impurities as the balance. In this regard, a plated layer is preferably a plated layer containing Al, Mg, and Si at the above contents, and which balance is Zn, and impurities.

The Al content is from 4 to 22% by mass. When the Al content is less than 4% by mass, the improvement effect on corrosion resistance is insufficient. When the Al content exceeds 22% by mass, the sacrificial corrosion protection effect of Zn is impaired, and corrosion resistance at a processed part and an edge is deteriorated. The content of Al is preferably from 5 to 15% by mass from the same viewpoint.

The Mg content is from 1.0 to 6.5% by mass. When the Mg content is less than 1.0% by mass, the improvement effect on corrosion resistance is insufficient. When the Mg content exceeds 6.5% by mass, the production amount of a Mg oxide in a plating bath becomes excessive, and the plating appearance is deteriorated. The content of Mg is preferably from 2 to 5% by mass from the same viewpoint.

The Mg content is ½ or less of Al in terms of % by mass. Namely, the ratio of the Mg content to the the Al content (Mg content/Al content) is ½ or less. When the Mg content exceeds ½ of Al (Al content), formation of an Al primary crystal becomes difficult or is stopped on equilibrium, and formation of a structure with a cellular dendrite-shaped Al primary crystal, a minute equi-axed dendrite-shaped Al primary crystal, a petal-shaped Al primary crystal, and an Al primary crystal with another shape, which enables achievement of a uniform Mg composition by means of a minute crystal constitution, becomes difficult or is stopped. Further, $Mg_2Si$ is formed to constitute an uneven structure. The content of Mg is preferably ⅓ or less of Al in terms of % by mass from the same viewpoint.

The Si content is from 0.001 to 1.000% by mass. When the Si content is less than 0.001% by mass, a Fe—Al alloy layer grows excessively at an interface between a plated layer and a steel sheet, and the adherence between a plated layer and a steel sheet becomes insufficient. When the Si content exceeds 1.000% by mass, an inhibitory effect on formation of a Fe—Al alloy layer is saturated, and further the processability of a coated steel sheet may be lowered. The content of Si is preferably from 0.100 to 0.500% by mass from the same viewpoint.

Concerning Si, depending on a composition $Mg_2Si$ may precipitate preferentially on equilibrium, however within the range of the invention, Si is contained in a plated layer in a state of a solid solution or minute precipitates in an Al primary crystal, or a structure other than an Al primary crystal.

Impurities are a component, which has been contained in a steel sheet itself, or stuck to a steel sheet at a step before plating, and diffuses to enter a plated layer after plating, or a component, which has been contained in a plating bath and remains as it is in a plated layer during a process for plating, provided that a component added to a plated layer intentionally is excluded. Specifically, examples of impurities include Pb, Sb, Co, Cu, In, Bi, Be, Zr, Ca, Sr, Y, Ce, and Hf. The content of impurities is preferably 0.0010% by mass or less.

A Zn—A—Mg plated layer may further contain one, or more selective elements singly or as a complex in a total amount of from 0.0001 to 1.0000% by mass. Specifically, a plated layer may contain one, or more selected from Ti, Nb, Fe, Ni, Cr, Sn, Mn, or B singly or as a complex in a total amount of from 0.0001 to 1.0000% by mass.

Among the selective elements, Fe is preferably present in a plated layer approximately at a saturated dissolution amount from the viewpoint of early stabilization of a composition near an interface between a plated layer and a steel sheet, because Fe dissolves out from a steel sheet toward a plated layer during immersion in a plating bath, and diffusion continues until a certain temperature even during cooling.

Although the amounts of selective elements other than Fe are less than Fe, they are components contained in a steel sheet such that their kinds and amounts are predetermined with respect to each steel grade, and it is preferable to aim at early stabilization of a composition as in the case of Fe. Although an influence of such a selective elements on formation of a dendrite constitution, etc. of an Al primary crystal is limited, when the amount is large, they may inhibit diffusion of Al or Mg. Consequently, the content of such elements is preferably from 0.0005 to 0.2000% by mass.

The selective elements are contained in a plated layer in a state of a solid solution, or minute precipitates in an Al primary crystal or a structure other than an Al primary crystal.

In this regard, the content of selective elements is a total amount of the selective elements contained in a plated layer. Further, "a plated layer contains selective elements in combination" means that selective elements are contained in a plated layer as a compound including two or more selective elements.

The coating amount of a plating including such component elements may be selected appropriately corresponding to an end use, and ordinarily it is, for example, from 30 to 150 $g/m^2$ per each side.

(Structure of Zn—A—Mg Plated Layer)

Next, the structure of a Zn—A—Mg plated layer as an object of the invention ("plated layer according to the invention" will be described.

The structure of a plated layer according to the invention is constituted with an Al primary crystal and a structure other than an Al primary crystal. The Al primary crystal is an Al primary crystal containing Mg, Si, and Zn in addition to Al.

An Al primary crystal will be described.

In the structure of a plated layer according to the invention an Al primary crystal includes: a cellular dendrite-shaped first Al primary crystal with an area rate of from 30 to 70% and a second axis spacing of from 0.5 to 2.0 μm (hereinafter also referred to as "cellular dendrite Al primary crystal"); a minute equi-axed dendrite-shaped second Al primary crystal with a principal axis length of from 5 to 10 μm and a second axis spacing of from 0.5 to 2.0 μm (hereinafter also referred to as "minute equi-axed dendrite Al primary crystal"); and a petal-shaped third Al primary crystal with a principal axis length of from 0.5 to 3.0 μm (hereinafter also referred to as "petal-shaped Al primary crystal"). wherein a total area rate of the minute equi-axed dendrite-shaped second Al primary crystal and the petal-shaped third Al primary crystal is of from 30 to 70%. In this regard, an area rate of each Al primary crystal is a ratio with respect to a volume of total Al primary crystals.

An Al primary crystal according to the invention includes a cellular dendrite Al primary crystal, a minute equi-axed dendrite Al primary crystal, a petal-shaped Al primary crystal, and an Al primary crystal with another shape such as a blocky shape, not belonging to the above three Al primary crystals, as a crystal with a shape not existing in a conventional plated layer. When an Al primary crystal with another shape, such as a conventional Al primary crystal with an equi-axed structure, and a blocky crystal, the area rate of the primary crystal with another shape is preferably less than 40%.

An Al primary crystal with another shape includes an Al primary crystal with a heretofore known columnar structure which does not satisfy the above range for the second axis spacing, and an Al primary crystal with an equi-axed structure which does not satisfy the above ranges for the principal axis length and the second axis spacing.

A cellular dendrite Al primary crystal has, for example, as shown in FIG. 1, a constitution having a plurality of parallel grown principal axes and a plurality of second axes crossing the principal axes at right angles (see FIG. 9A and FIG. 9B).

A second axis spacing of a cellular dendrite Al primary crystal is a spacing D12 between the central axes of two adjacent second axes.

A minute equi-axed dendrite Al primary crystal has, for example, as shown in FIG. 1, a constitution having principal axes grown radially from a central part and second axes grown branching from the principal axis. The principal axis length of a minute equi-axed dendrite Al primary crystal is a length D21 from the end of the center side to the other end. The second axis spacing of a minute equi-axed dendrite Al primary crystal is a spacing D22 between the central axes of two adjacent second axes.

A petal-shaped Al primary crystal has, for example, as shown in FIG. 1, a constitution having principal axes grown radially from a central part. A petal-shaped Al primary crystal may be deemed as an equi-axed crystal in which secondary axes (secondary branches) have not developed. The principal axis length of a petal-shaped Al primary crystal is a length D31 from the end of the center side to the other end.

FIG. 1 is a schematic plan view showing the shapes of an Al primary crystal in a plated layer according to the invention.

In this regard, FIG. 2 shows an example of SEM (Scanning Electron Microscopic) micrographs of a plated layer of a Zn—A—Mg coated steel sheet according to the invention observed from the surface. FIG. 2 shows SEM micrographs at magnification of 100×, and 1000×.

FIG. 3 shows an example of an SEM (Scanning Electron Microscopic) micrograph observing a cross-section of a plated layer of a Zn—A—Mg coated steel sheet according to the invention. FIG. 3 shows an SEM micrograph at magnification of 1000×.

Meanwhile, FIG. 4 shows an example of SEM (Scanning Electron Microscopic) micrographs of a plated layer of a Zn—A—Mg coated steel sheet according to Comparative Example (plated layer of Comparative Example) observed from the surface. FIG. 4 shows SEM micrographs at magnification of 100×, and 1000×.

A plated layer of Comparative Example is a plated layer on a coated steel sheet produced by plating molten zinc with the same components as in the invention on a steel sheet using an ordinary cooling method such as gas cooling and air-water cooling.

As shown in FIG. 4, a plated layer of Comparative Example includes an Al primary crystal with an equi-axed structure having a principal axis length of from 50 to 200 μm, and a second axis spacing of from 5 to 20 μm. On the other hand as shown in FIG. 2 and FIG. 3, it is obvious that a plated layer according to the invention has an Al primary crystal with a minute solidified structure including a cellular dendrite Al primary crystal with the aforedescribed size, a minute equi-axed dendrite Al primary crystal with the aforedescribed size, and a petal-shaped Al primary crystal with the aforedescribed size, in contrast to the Al primary crystal of a plated layer according to a Comparative Example. Namely, a minute equi-axed dendrite Al primary crystal with the aforedescribed size, and a petal-shaped Al primary crystal with the aforedescribed size in a plated layer according to the invention are minute Al primary crystal structures different from an Al primary crystal with a coarse equi-axed structure in a plated layer of Comparative Example.

In this regard, in FIG. 2 a region surrounded by a solid line is a region with a cellular dendrite Al primary crystal (cellular dendrite-shaped Al primary crystal). A region surrounded by a long dashed short dashed line is a region with a minute equi-axed dendrite Al primary crystal. A region surrounded by a long dashed double-short dashed line is a region with a petal-shaped Al primary crystal or an Al primary crystal of another shape (blocky, etc.)

In a Zn—A—Mg plated layer, the constitution of a generating Al primary crystal is changed mainly by a cooling initiation temperature, and a cooling rate. Although the corrosion resistance of a Zn—A—Mg plated layer owes to an effect of Mg, it has become clear that the shape or distribution of an initially generated Al primary crystal has an influence on stable maintenance of corrosion resistance. Further, the inventors have found that when an Al primary crystal with a minute solidified structure included three kinds of Al primary crystals of a cellular dendrite Al primary crystal with the aforedescribed size, a minute equi-axed dendrite Al primary crystal with the aforedescribed size, and a petal-shaped Al primary crystal with the aforedescribed size as an Al primary crystal at predetermined area rates, the corrosion resistance can be superior, and the corrosion resistance (corrosion weight loss) can be maintained stably.

Specifically, as shown in Examples below, it has been found that corrosion resistance (corrosion weight loss) according to the invention can be remarkably superior to Comparative Example, and a corrosion weight loss representing corrosion resistance can be secured to be ⅔ or less thereof.

In an Al primary crystal the area rate of a cellular dendrite Al primary crystal is preferably from 40 to 70% from the viewpoint of improvement of the corrosion resistance and stable maintenance of the corrosion resistance, and more preferably from 50 to 70%. From the same viewpoint, the combined area rate of a minute equi-axed dendrite Al primary crystal and a petal-shaped Al primary crystal is preferably from 30 to 60%, and more preferably from 30 to 40%. These structures may be included jointly.

A cellular dendrite Al primary crystal can be identified by observing from the above to see whether a dendrite shape has grown in the direction of 90° or not (see FIG. 2). Since also in a cross-section a second axis (secondary branch) of a dendrite and a first axis (primary branch) cross at right angles, a cellular dendrite shape can be identified (see FIG. 3). However, an oblique section may appear at a surface, and in this case it appears as a rhomboid.

Further, when a cross-section perpendicular to a surface is observed, it can be known that a second axis (secondary branch) has grown perpendicular to a first axis (primary branch). On the other hand, it can be known from FIG. 4 that in a structure in the same cross-section of a conventional coated steel sheet, a second axis (secondary branch) has not grown perpendicular to a first axis (primary branch).

Since fluctuation of segregation among cellular dendrite Al primary crystals is mild compared to the same among minute equi-axed dendrite Al primary crystals, and petal-shaped Al primary crystals, it is conceivable that the corrosion resistance is improved further, when a cellular dendrite Al primary crystal is contained in a predetermined range. In a minute equi-axed dendrite Al primary crystal there is a principal axis (trunk), from which second axes (primary branches), third axes (secondary branches) have grown. Observing from the above, the crystal does not grow in the direction of 90° in a cellular form, and fluctuation of segregation among trees is large. A petal-shaped Al primary crystal has only a principal axis, but no second axis, nor third axis. Observing from the above, the crystal does not grow in the direction of 90° in a cellular form similarly as in the case of a minute equi-axed dendrite Al primary crystal, and fluctuation of segregation among trees is also similarly large. In the case of a production method using a cooling rate range according to the invention, a minute equi-axed dendrite Al primary crystal and a petal-shaped Al primary crystal can be clearly distinguished and identified in terms of the shape. However, in a case where a cooling rate is low as in some of Comparative Examples, not only a principal axis, but also a second axis, or a third axis grows easily, such that the two Al primary crystals become hardly distinguishable. Therefore in comparing the area rate of an Al primary crystal according to the invention, the total area rate of a minute equi-axed dendrite Al primary crystal and a petal-shaped Al primary crystal is compared with the area rates of a cellular dendrite Al primary crystal and an Al primary crystal with another shape, having clearly different constitutions.

In this regard, the area rates of a cellular dendrite Al primary crystal, a minute equi-axed dendrite primary crystal, a petal-shaped Al primary crystal, and an Al primary crystal with another shape are values determined by the following method.

With respect to an area rate of an Al primary crystal, using a 1000× magnified SEM image, 5 visual fields (N=5) per sample are analyzed by a commercially-supplied image analysis software, such that Al primary crystals with respective shapes are identified and from their areas the area rates of Al primary crystals are determined according to the following computation formulae.

Area rate of cellular dendrite Al primary crystal=Total area of cellular dendrite Al primary crystals/Total area of Al primary crystals× 100     Formula:

Area rate of minute equi-axed dendrite Al primary crystal=Total area of minute equi-axed dendrite Al primary crystals/Total area of Al primary crystals×100     Formula:

Area rate of petal-shaped Al primary crystal=Total area of petal-shaped Al primary crystals/Total area of Al primary crystals×100     Formula:

Area rate of Al primary crystal with another shape=Total area of Al primary crystals with another shape/Total area of Al primary crystals× 100     Formula:

In this regard, the area of each Al primary crystal is the area of a region where the Al primary crystal is present, which includes an area occupied by the Al primary crystal and by a eutectic structure present among trees (axes) of the Al primary crystal. Namely, the area rate of each Al primary crystal is the area rate of a region including the Al primary crystal and a eutectic structure present among trees (axes) of the Al primary crystal.

A structure other than an Al primary crystal will be described.

In a structure of a plated layer according to the invention, a structure other than an Al primary crystal is constituted with a ternary eutectic structure of Al, Zn, and $Mg_2Zn_{11}$. However, the ternary eutectic structure contains occasionally a small amount (5% by volume or less) of $MgZn_2$.

It is preferable that the structure of a plated layer according to the invention does not include $Mg_2Si$. In this regard, "does not include $Mg_2Si$" means hereunder, for example, "when an X-ray diffraction spectrum is measured, the relevant peak is not recognized". Specifically, in a measured result shown in FIG. 5A (measurement of intensity of an X-ray diffraction spectrum of a plated layer) the peak of $Mg_2Si$ was not higher than a noise (approximately 50 CPS) with respect to the maximum peak intensity of 35,000 CPS, and not detected.

In the case of conventional plating the corrosion resistance was enhanced by inclusion of $Mg_2Si$, however since heretofore not existing plating crystals enhance corrosion resistance according to the invention, it is conceived that absence of $Mg_2Si$ is even better for avoiding influence on corrosion resistance.

When a coated steel sheet is produced by plating a steel sheet using molten zinc having the same components as in the invention and cooling by an ordinary method, such as gas cooling, or air-water cooling, a product is produced in a state that equi-axed dendrite-shaped Al primary crystals with, for example, a principal axis length of from 50 to 200 μm, and a second axis spacing of from 5 to 20 μm, are dispersed in a eutectic constituted with Zn, Al, and $MgZn_2$ (see FIG. 4). This is conceivably because in the order of solidification, firstly after initiation of cooling an Al primary crystal with a high solidification initiation point precipitates and grows everywhere in a plated layer, then a eutectic structure of Al and $MgZn_2$ precipitates in the surroundings of an Al primary crystal, and after further cooling a ternary eutectic structure of Zn, Al, and $MgZn_2$ is formed, eventually to form a constitution in which the gaps around an Al primary crystal are filled with $MgZn_2$ and Mg.

With respect to a Mg—Zn compound, $Mg_2Zn_{11}$ is supposed to be formed and stabilized as an equilibrium composition from a ternary equilibrium phase diagram, however ordinarily $MgZn_2$, which nucleation and growth speed is believed to be high, is formed preferentially, presumably supported by similar precipitation driving force. Under operational conditions according to Patent Literature 4 using liquid spray cooling, the solidification speed becomes high and consequently the influence of the nucleation and growth speed is relatively decreased, so that $Mg_2Zn_{11}$, which is closer to an equilibrium composition, is conceivably formed easily. According to Patent Literature 5, $Mg_2Zn_{11}$ is formed where the degree of supercooling is high, and it may be expected that $MgZn_2$ is formed when uneven cooling is avoided and uniform cooling is achieved.

Further, with respect to a Mg—Si compound, ordinarily $Mg_2Si$ is formed because Si is contained in molten zinc, however according to the invention, since a compound is believed to be formed deviating from an equilibrium phase diagram, it is conceived that $Mg_2Si$ is not formed in many cases.

Meanwhile, for investigating the composition of a plated layer according to the invention, the intensity of an X-ray diffraction spectrum using a Cu radiation source was examined. FIG. 5A shows the intensity of an X-ray diffraction spectrum of a plated layer according to the invention (coated steel sheet used in Example) plotted against a diffraction angle 2θ. FIG. 5B shows the intensity of an X-ray diffraction spectrum of a plated layer according to the invention (coated steel sheet (10) used in Example) plotted against a diffraction angle 2θ. ● (closed circle) stands for a peak of Zn, ▼ (closed inverted triangle) for an Al peak in any case, ■ (closed square) for a peak of $MgZn_2$, and ♦ (closed rhombus) for a peak of $Mg_2Zn_{11}$. With respect to Si there appeared no peak because an X-ray diffraction intensity was so low due to a low concentration.

The intensity of an X-ray diffraction spectrum was measured using RINT2000 produced by Rigaku Corporation with a Cu (Kα) radiation source under conditions of a tube voltage of 40 kV, and a tube current of 150 mA.

The respective element distributions with respect to Mg, Al, Zn, and Si were examined in a plated layer of Comparative Example to find, as shown in FIG. 6, a plurality of regions, where Mg and Si are simultaneously distributed at a high concentration (white), and Al and Zn are not distributed (black) confirming presence of a Mg—Si compound. This indicated high possibility of presence of $Mg_2Si$ in a plated layer of Comparative Example. FIG. 6 shows an SEM (Scanning Electron Microscopic) micrograph observing a cross-section of a plated layer of Comparative Example, as well as respective measurement results of the element distributions of Mg, Al, Zn, and Si by an EDS (Energy Dispersive X-ray Spectrometer). With respect to each element, a higher concentration looks brighter.

As shown in FIG. 5B and FIG. 6, a plated layer of Comparative Example produced with an ordinarily cooling method is with high possibility constituted with Zn, Al, Si, $MgZn_2$, and $Mg_2Si$. On the other hand, a plated layer according to the invention is constituted with Al, Zn, Si, and $Mg_2Zn_{11}$. In other words, the structure of a plated layer according to the invention is different from a conventional structure, in that it does not include $Mg_2Si$, and a structure other than an Al primary crystal is constituted with a ternary eutectic structure including Al, Zn, and $Mg_2Zn_{11}$. In this regard, it is conceivable that in a plated layer according to the invention Si is contained as a solid solution, or a minute precipitate in a ternary eutectic structure of Al, Zn, and $Mg_2Zn_{11}$.

In a Zn—A—Mg plated layer, the constitution of a forming structure other than an Al primary crystal is also changed mainly by a cooling initiation temperature, and a cooling rate. The distribution of Mg and the composition of a Mg—Zn compound has an influence on the corrosion resistance of a Zn—A—Mg plated layer. The inventors have discovered that by making an Al primary crystal have the aforedescribed structure, and moreover by constituting a structure other than an Al primary crystal with a ternary eutectic structure of Al, Zn, and $Mg_2Zn_{11}$, a Zn—A—Mg plated layer can be superior in corrosion resistance, and able to maintain stably the corrosion resistance (corrosion weight loss).

In other words, since a plating structure according to the invention is a structure different from a conventional plating structure, it is preferable that the structure of a Zn—A—Mg plated layer has a constitution not including $Mg_2Si$. Further, it is found that with the constitution a plated layer can be superior in corrosion resistance, and able to maintain stably the corrosion resistance (corrosion weight loss).

(Element Distribution in Zn—A—Mg Plated Layer)

The element distribution of a plated layer according to the invention will be described.

The respective element distributions of Mg, Al, Zn, and Si in a Zn—A—Mg plated layer according to the invention were investigated. FIG. 7 shows an SEM (Scanning Electron Microscopic) micrograph observing a plated layer according to the invention from the surface, as well as respective measurement results of the element distributions of Mg, Al, Zn, and Si by an EDS (Energy Dispersive X-ray Spectrometer). With respect to each element, a higher concentration looks brighter.

Similarly, the respective element distributions of Mg, Al, Zn, and Si in a Zn—A—Mg plated layer of Comparative Example were investigated. FIG. 8 shows an SEM micrograph observing a plated layer of Comparative Example from the surface, as well as respective measurement results of the element distributions of Mg, Al, Zn, and Si by an EDS. A plated layer of Comparative Example is a plated layer on a coated steel sheet produced by plating molten zinc with the same composition as in the invention on a steel sheet and then using an ordinary cooling method such as gas cooling and air-water cooling.

As obvious from FIG. 8, in a plated layer of Comparative Example, Mg is distributed in a ternary eutectic structure other than an equi-axed dendrite-shaped Al primary crystal, and Zn is unevenly distributed in a ternary eutectic structure other than an equi-axed dendrite-shaped Al primary crystal.

In contrast as shown in FIG. 7, in a plated layer according to the invention, both Mg, and Zn are distributed in the entire plated layer. Further, the Al concentration in a cellular dendrite Al primary crystal (component element content of Al) is lower than the Al concentrations in a minute equi-axed dendrite Al primary crystal (central part), and a petal-shaped Al primary crystal.

As above, the element distribution feature of a plated layer according to the invention is also different from that of a plated layer of Comparative Example. Further, the inventors believe that the element distribution feature of a plated layer also contributes to improvement and maintenance of corrosion resistance.

(Contents of Component Elements in Each Structure in Zn—A—Mg Plated Layer)

Next, the contents (by mass) of component elements in each structure in a Zn—A—Mg plated layer according to the invention were investigated. Table 1 shows measurement results of the contents (by mass) of component elements in 1A) a principal axis of a cellular dendrite Al primary crystal with a cellular dendrite constitution, 2A) a central part of a minute equi-axed dendrite Al primary crystal, 3A) a principal axis of a minute equi-axed dendrite Al primary crystal, 4A) a petal-shaped Al primary crystal, and 5A) a structure other than an Al primary crystal, in a plated layer according to the invention.

Similarly, the contents (by mass) of component elements of a structure with each constitution in Zn—A—Mg plated layer of Comparative Example were investigated. Table 2 shows measurement results of the contents (by mass) of component elements in 1B) a principal axis of an Al primary crystal with an equi-axed structure, 2B) a central part of an Al primary crystal with an equi-axed structure, 3B) a structure other than an Al primary crystal located at the base of a region between principal axes of an Al primary crystal with an equi-axed structure, 4B) a structure other than an Al primary crystal located at the frontal tip of a region between principal axes of an Al primary crystal with an equi-axed structure, and 5B) a structure other than an Al primary crystal located outside a region between principal axes of an Al primary crystal with an equi-axed structure, in a plated layer of Comparative Example.

In this regard, "-" in Table 1 and Table 2 represents that a measurement was below a measurement limit value, and deemed as "0% by mass".

In this regard, the content (by mass) of a component element was measured by SEM-EDS using JSM 7000F (produced by JEOL Ltd.) under conditions of: acceleration voltage=15 V, and electron beam diameter=10 um.

TABLE 1

Plated layer according to the invention

| | Cellular dendrite Al primary crystal Principal axis | Minute equi-axed dendrite Al primary crystal Central part | Minute equi-axed dendrite Al primary crystal Principal axis | Petal-shaped Al primary crystal | Structure other than Al primary crystal |
|---|---|---|---|---|---|
| Zn (% by mass) | 71.9 | 49.9 | 81.4 | 63.8 | 89.0 |
| Al (% by mass) | 22.1 | 32.3 | 11.7 | 28.8 | 5.3 |
| Mg (% by mass) | 2.1 | 1.5 | 2.5 | 1.5 | 1.4 |
| Si (% by mass) | — | 0.05 | — | 0.1 | 0.1 |

| | Minimum value | Maximum value | Mean value | Maximum value − Mean value | (Maximum value − Mean value)/Mean value |
|---|---|---|---|---|---|
| Zn (% by mass) | 63.8 | 89.0 | 76.4 | 12.6 | 17% |
| Al (% by mass) | 5.3 | 32.3 | 18.8 | 13.5 | 72% |
| Mg (% by mass) | 1.4 | 2.5 | 2.0 | 0.6 | 30% |
| Si (% by mass) | — | 0.1 | 0.05 | 0.05 | 100% |

TABLE 2

Plated layer of Comparative Example

| | Al primary crystal Principal axis | Al primary crystal Central part | Structure other than Al primary crystal (Base of region between principal axes) | Structure other than Al primary crystal (Frontal tip of region between principal axes) | Structure other than Al primary crystal (Outside region between principal axes) |
|---|---|---|---|---|---|
| Zn (% by mass) | 55.6 | 64.9 | 91.8 | 85.4 | 81.9 |
| Al (% by mass) | 38.6 | 32.1 | 3.7 | 2.0 | 0.9 |
| Mg (% by mass) | 0.4 | 0.4 | 1.6 | 9.9 | 14.2 |
| Si (% by mass) | 0.3 | 0.1 | 0.2 | — | 0.03 |

| | Minimum value | Maximum value | Mean value | Maximum value − Mean value | (Maximum value − Mean value)/Mean value |
|---|---|---|---|---|---|
| Zn (% by mass) | 55.6 | 91.8 | 73.7 | 18.1 | 25% |
| Al (% by mass) | 0.9 | 39.6 | 19.75 | 18.85 | 95% |
| Mg (% by mass) | 0.4 | 14.2 | 7.3 | 6.9 | 95% |
| Si (% by mass) | — | 0.30 | 0.15 | 0.15 | 100% |

Different from a plated layer of Comparative Example, with respect to a plated layer according to the invention, the variances of the contents of component elements of a structure in each constitution are small, except Si which absolute quantity is very low. Further, in a plated layer according to the invention, the content of an Al component element in a cellular dendrite Al primary crystal is lower than in the central part of a minute equi-axed dendrite Al primary crystal.

In other words, with respect to the component element contents of a structure in a plated layer according to the invention, a mass ratio, namely a value of the difference between the maximum value and the mean value divided by the mean value of the component element content for Zn, Al, or Mg, and the maximum value of Si are preferably within the following ranges. In this regard, the maximum value and the mean value are values calculated when component element contents are measure at the above measurement positions 1A) to 5B).

A value of the difference between the maximum value and the mean value divided by the mean value of the Zn component element content is 20% or less (preferably 15% or less), a value of the difference between the maximum value and the mean value divided by the mean value of the Al component element content is 75% or less (preferably 60% or less), a value of the difference between the maximum value and the mean value divided by the mean value of the Mg component element content is 60% or less (preferably 30% or less), and the maximum value of the Si component element content is 0.2% by mass or less.

The inventors conceive that the ranges of a value of the difference between the maximum value and the mean value divided by the mean value of the component element contents of Zn, Al, or Mg, and the maximum value of the same of Si in a Zn—A—Mg plated layer contribute to improvement and maintenance of corrosion resistance.

(Production of Coated Steel Sheet According to the Invention (Formation of Plated Layer))

A coated steel sheet according to the invention is produced, for example, as follows.

Firstly, molten zinc containing the component elements is plated on at least one side of a steel sheet (original sheet). This plating of molten zinc may be performed by, for example, dipping a steel sheet in a plating bath with molten zinc. Next, wiping is carried out to remove excessive molten zinc adhered to the steel sheet to attain a predetermined coating weight of a plated layer. Then, the steel sheet plated with molten zinc is cooled to solidify plating components to form a plated layer.

For obtaining a plated layer having the aforedescribed structure, it is preferable to cool down rapidly from a state where the composition for a plated layer is melted uniformly to a temperature where the structure of an Al primary crystal does not change any more. Meanwhile, when the temperature is raised excessively for attaining a state where the composition for a plated layer is melted uniformly, a steel matrix of a steel sheet reacts with a metal in a composition for a plated layer to form excessively a Fe—Al alloy layer (for example, $Fe_2Al_5$ layer) at an interface between a plated layer and a steel sheet, which may deteriorate the corrosion resistance of a coated steel sheet.

For formation of a cellular dendrite Al primary crystal (transition of an Al primary crystal to a cellular dendrite Al primary crystal), the solidification speed of an Al primary crystal has an influence. Specifically, the shape is determined by a balance between the temperature gradient during solidification of an Al primary crystal and a growth speed of an Al primary crystal structure. The inventors have found that formation of a cellular dendrite Al primary crystal is strongly affected by the temperature gradient, and formation of a cellular dendrite Al primary crystal is promoted by a specific quenching condition.

In this regard, the temperature gradient means a temperature gradient at a solidification interface of an Al primary crystal, and determined by a relationship between a solidification latent heat and cooling (heat removal). Meanwhile, that a temperature gradient is large means a state where heat removal surpasses greatly and continuously a solidification latent heat. Namely, for increasing a temperature gradient during cooling, it is favorable to enhance an overall heat-transfer coefficient [$\alpha$: $W/(m^2 \cdot K)$] during cooling.

Therefore, for yielding a plated layer having the above structure, cooling is preferably performed such that (a surface of) a steel sheet plated with the molten zinc is regulated to a temperature range of from 30° C. higher than a solidification initiation temperature of an Al primary crystal to 520° C. (temperature before initiation of cooling), and then cooled from the temperature to a temperature of 370° at a cooling rate of 500° C./sec or more (preferably from 800° C./sec to 2000° C./sec), and securing an overall heat-transfer coefficient during cooling of from 1000 to 3000 $W/(m^2 \cdot K)$ (preferably from 2000 to 3000 $W/(m^2 \cdot K)$). Under such cooling conditions, a cellular dendrite Al primary crystal is formed in an obtained plated layer, but an amorphous structure is not formed.

When cooling is performed by a cooling method with an overall heat-transfer coefficient beyond 3000 $W/(m^2 \cdot K)$, an amorphous phase is formed, and not only the contents of a cellular dendrite Al primary crystal, a minute equi-axed dendrite Al primary crystal, and a petal-shaped Al primary crystal is lowered, but also the corrosion resistance is remarkably decreased, because the amorphous structure does not have a specific crystal constitution to accelerate solving out of a Mg component, which is undesirable.

In this regard, an overall heat-transfer coefficient means power ($W/(m^2 \cdot K)$) required for changing a temperature by 1° C. per unit area of a heat-transfer surface (namely a plated layer surface of a steel sheet plated with molten zinc).

Conceivably, a minute equi-axed dendrite Al primary crystal, and a petal-shaped Al primary crystal are also formed by cooling with nearly the same overall heat-transfer coefficients.

For achieving cooling under the above conditions, water immersion cooling, or the like is preferable, by which a steel sheet (for example, a steel sheet with a sheet thickness of from 0.5 to 4 mm) is immersed in water and cooled. In water immersion cooling according to the invention, a region from transition boiling to film boiling is used for the sake of heat-transfer control. Meanwhile, as a method for enhancing cooling efficiency further, there is a method, such as a method using a low water temperature (e.g. a low water temperature by keeping the water temperature low by circulative cooling of water in a water tank using a chiller), or a method of preventing inhibition of heat-transfer by transition boiling by destructing a boiling film. However as described above, if an overall heat-transfer coefficient exceeds 3000 $W/(m^2 \cdot K)$, an amorphous phase is formed and the corrosion resistance is conversely deteriorated, and therefore the above method is only applicable to a case where a thick steel sheet (for example, a steel sheet with a sheet thickness beyond 4 mm) is used, a case where a steel sheet is required to be cooled evenly in the width direction, or the like. As a method of destructing a boiling film, there is a method by which a water spray is impinged on a steel sheet in water, and the method may be performed with the water temperature and the water stream as operative parameters. The water temperature is preferably beyond 10° C. and less than 95° C., and with respect to a water stream the velocity component of the water stream in the direction vertical to a steel sheet is preferably in a range of from 1 m/s to 100 m/s.

An overall heat-transfer coefficient at water immersion cooling is calculated by installing a thermocouple welded to a steel sheet, measuring a temperature change by heating and cooling the steel sheet, calculating an exchanged heat quantity from the temperature change and physical property values such as specific heat, and calculating, based on the same as well as a sheet sending velocity, a sheet width, and a steel ribbon thickness, a transferred heat quantity per unit time, unit area, and unit temperature change. A cooling rate is calculated as a temperature difference per unit time from the steel sheet temperature and time at immersion in water, and the temperature and time when the steel sheet temperature drops below 100° C. At an actual measurement, the time difference between the two time points was from approximately 0.01 to 0.10 sec.

In a case in which circulating water cooling (cooling tower, chiller. etc.) is not used, the water temperature will rise up to nearly 100° C., so that the cooling rate drops. If it drops even below 500° C./sec, the corrosion resistance is deteriorated. As another rapid cooling method there is a roll/air-water cooling method, by which a steel sheet plated with molten zinc is sent through one or plural nips of metallic roller pairs cooled with internal circulative cooling water (for example, nips of three copper roller pairs) and then air-water is blown for cooling. Although by this method, cooling at approximately 400° C./sec close to the aforedescribed cooling rate is possible, cooling unevenness is likely to appear and a new problem of steel sheet deformation arises, and therefore this is not an effective method of implementing the invention.

In the case of water immersion cooling, in a temperature range according to the invention film boiling occurs during immersion in water, and cooling is performed in a state where a stable boiling film is present between a plated layer of a steel sheet and water. In other words, by water immersion cooling, cooling is performed keeping a state where heat removal by vaporization is significant and the heat removal surpasses a solidification latent heat continuously, and the overall heat-transfer coefficient during cooling is as high as, for example, from 2000 to 3000 W/(m$^2$·K). The overall heat-transfer coefficient during air-water cooling is, for example, approximately from 300 to 900 W/(m$^2$·K), and the overall heat-transfer coefficient during gas cooling is, for example, approximately from 150 to 400 W/(m$^2$·K). Consequently, by water immersion cooling, cooling with a high overall heat-transfer coefficient during cooling, and a large cooling rate and temperature gradient can be achieved. Therefore, a coated steel sheet with a plated layer having the aforedescribed structure can be easily obtained.

On the other hand, in the case of an ordinary cooling means, such as laminar flow water cooling, spray cooling, and air-water cooling, film boiling is performed intermittently, and therefore a state where heat removal surpasses a solidification latent heat becomes also intermittent and the overall heat-transfer coefficient cannot be kept high continuously. Further in the case of gas cooling, even when the gas temperature is lowered, a heat removal amount is limited and a state where heat removal surpasses a solidification latent heat cannot be formed even intermittently, and therefore the overall heat-transfer coefficient cannot be kept high continuously.

A cooling rate and a temperature gradient during cooling may be determined by measuring a surface temperature of a coated steel sheet before initiation of cooling and after cooling, and performing a thermal analysis by computation. In this case, a temperature of a coated steel sheet before initiation of cooling is measured at a position where the temperatures of a steel matrix of a steel sheet and a plated layer are substantially the same, and a surface temperature of a coated steel sheet after cooling is measured at a position where the steel sheet is cooled enough to a temperature not affecting formation of a cellular dendrite Al primary crystal. Correction by computation is allowed. An overall heat-transfer coefficient may be found at the same time by an unsteady thermal conductivity analysis calculation.

When cooling is initiated in a state where the plated layer surface temperature of a steel sheet before initiation of cooling is the same as a plating bath temperature or higher than a plating bath temperature, cooling from a temperature range of from 30° C. higher than a solidification initiation temperature of an Al primary crystal to 520° C. can be conducted easily, and therefore it is appropriate. When the cooling is performed, it is preferable to heat a steel sheet by electromagnetic induction heating, heating by a combustion gas, Joule heating, or the like before cooling.

With respect to cooling below 370° C. there is particularly no restriction. Because by cooling below 370° C. there occurs no particular change in the structure of an Al primary crystal. Namely, the structure of an Al primary crystal is determined from initiation of cooling to 370° C. However, for example, in a case where cooling below 370° C. is performed by natural cooling, MgZn$_2$ precipitates additionally between 370° C. and 336° C., and then the particle size of MgZn$_2$ may grow and the corrosion resistance of a coated steel sheet may be deteriorated. Therefore, the whole cooling process should preferably be performed by cooling under the aforedescribed conditions.

A coated steel sheet according to the invention may have an alloy layer (for example, an Fe—Al alloy layer such as a Fe$_2$Al$_5$ layer) at an interface between a plated layer and a steel sheet, however if a Fe—Al alloy layer is formed excessively, it is feared that the corrosion resistance may be decreased or the plating adherence may be deteriorated. Therefore it is preferable that a coated steel sheet according to the invention does not have an alloy layer at an interface between a plated layer and a steel sheet.

EXAMPLE

The present invention will be described more specifically below by way of Examples, provided that the Examples in no way restrict the present invention.

(Production of Coated Steel Sheet)

Following the various conditions set forth in Table 3 and Table 4, plating was performed using a 0.8 mm-thick hot rolled steel sheet (carbon content: 0.2% by mass) as an original sheet for plating (a steel sheet as a base material for a coated steel sheet). Treatments before plating were degreasing, pickling, and annealing, and no special pretreatment having influence on an effect of the invention was performed. Although a hot rolled steel sheet was used in Example, there is no particular restriction on a steel sheet, insofar as it is a steel sheet in a condition suitable for plating, such as a cold-rolled steel sheet, and an annealed cold-rolled steel sheet, ordinarily used for plating. There is no particular problem on a sheet thickness, insofar as a steel sheet has a sheet thickness of from 0.5 to 4 mm. In Example a steel sheet is directly plated without performing Ni plating. However, Ni plating is not excluded, but it is not necessary either.

An original sheet was dipped in a molten zinc plating bath with predetermined components and a temperature for 3 seconds and then adjusted to a coating weight of a plated layer of approximately 140 g/m$^2$ per one side by nitrogen wiping. Then the surface temperature of the plated layer of the steel sheet (temperature before cooling) was regulated to a predetermined temperature, namely from 30° C. higher than a solidification initiation temperature of an Al primary crystal to 520° C., and then the steel sheet was cooled rapidly within an extremely short time from the temperature to a temperature below 370° C. to form a plated layer on the steel sheet. Through this process step the respective Zn—A—Mg coated steel sheets No. 1 to No. 21 were yielded. In this regard, the whole cooling process for a plated layer of the coated steel sheet was performed according to various conditions set forth in Table 4.

In Table 3 in the column of "Al primary crystal solidification temperature" and in the row of Component of molten zinc plating bath (D), the solidification temperature of MgZn$_2$ is shown. In Table 3 in the column of "Impurities", part of detected impurities are shown.

In the column of cooling method of Table 4 the notation of "water immersion cooling" means a cooling method by which a steel sheet is immersed in water with a water temperature of from 35° C. to 45° C. The water temperature for water immersion cooling was regulated to a predetermined temperature by circulating water for cooling at a cooling tower, and tuning a circulating water quantity. In water immersion cooling, a region from transition boiling to film boiling was used for a heat-transfer control.

The notation of "roll cooling+air-water cooling" refers to a roll/air-water cooling method by which a steel sheet is sent through 3 nips of copper roller pairs, and then air-water is blown thereon for cooling. By the roll/air-water cooling method a steel sheet is sent through 3 nips of copper roller pairs, which are chilled by internal circulative cooling water, at a high speed of approximately 2 m/sec for quenching the plated layer and an extremely thin surficial layer of the steel sheet to solidify the plated layer. Further, an air and water nozzle is installed at the exit of the 3rd copper roller pair, from which air-water is blown in order to prevent the plated layer from re-melting by a heat from a high temperature central part of the steel sheet, and to fix the solidified components of the plated layer.

The notation of "roll intensive cooling+air-water cooling" refers to a cooling method by which internal circulative cooling water is cooled to from 5° C. to 10° C. (entry-side water temperature) by a chiller for enhancing its cooling capacity.

The notation of "water immersion cooling (low water temperature, in-water spray)" refers to a cooling method by which circulative cooling is performed using a chiller to keep the water temperature at from 5 to 10° C., and branched circulating water is impinged vertically on the sheet in water from 15 nozzles placed on each side apart from the sheet by 50 mm, at the rate of 20 L/min per nozzle.

The notation of "water immersion cooling (high water temperature)" refers to a cooling method by which water in a water tank is used without cooling allowing the temperature to rise up to 95° C.

In the production of a coated steel sheet, for a case in which the surface temperature of a plated layer of a steel sheet before rapid cooling (in Table 4 denoted as "temperature before cooling") was the same as a bath temperature, or higher than a bath temperature, induction heating was performed to raise the temperature.

(Various Measurements)

Measurements according to the above methods were carried out with respect to a structure of a plated layer of the produced coated steel sheet (an Al primary crystal, and a structure other than an Al primary crystal).

Further, with respect to a structure of a plated layer of the produced coated steel sheet, analyses of a peak distribution of an X-ray diffraction spectrum using a Cu radiation source, and an element distribution by SEM-EDS were performed for identification to have confirmed the substance constitution of a structure other than an Al primary crystal.

Further, the element distribution of a plated layer of the produced coated steel sheet was measured according to the above method, and values of the difference between the maximum value and the mean value divided by the mean value with respect to Zn, Al, and Mg, as well as the maximum value of Si were examined.

(Evaluation of Corrosion Resistance)

For evaluation of corrosion resistance, a sample was taken from a plated layer of a coated steel sheet after cooling, and subjected to a wet-dry combined cycle test (JASO test) using 5%-NaCl, and a corrosion weight loss of a plating after 60 cycles was examined. The result was rated as follows.

In this regard, the JASO test means JASO M610 salt spray wet-dry cycle test (corresponding to JIS H 8502) stipulated in JASO (Japanese Automobile Standard).

A: Corrosion weight loss ≤20 g/m$^2$
B: 20 g/m$^2$<corrosion weight loss ≤25 g/m$^2$
C: 25 g/m$^2$<corrosion weight loss Various conditions for production of a coated steel sheet, various measurement results and evaluation results are tabulated in Table 3 to Table 6. In this regard, a corrosion weight loss according to the JASO test is not necessarily proportional to the cycle number, and in the corrosion resistance test according to the invention, part of samples were tested up to 200 cycles, but the results were on the same level.

TABLE 3

| | Components of molten zinc plating bath (% by mass): Balance: Zn + Impurities | | | | | Al primary crystal solidification temperature |
|---|---|---|---|---|---|---|
| | Al | Mg | Si | Selective element | Impurities | |
| (A) | 11 | 3.0 | 0.200 | none | Pb: 0.0005 Ca: 0.001 | 428° C. |
| (B) | 11 | 3.0 | 0.200 | Fe: 0.0200 | Pb: 0.0004 | 428° C. |
| (C) | 30 | 3.0 | 0.200 | none | — | 510° C. |
| (D) | 11 | 10.0 | 0.200 | none | Pb: 0.0005 | 516° C. (MgZn$_2$) |
| (E) | 5 | 3.0 | 0.200 | none | Pb: 0.0001 Co: 0.0001 | 367° C. |
| (F) | 14 | 6.0 | none | none | — | 444° C. |
| (G) | 22 | 1.0 | 0.200 | none | Pb: 0.0005 Ca: 0.001 | 500° C. |

TABLE 4

| Coated steel sheet No. | Plating bath No. | Plating bath temperature (° C.) | Temperature before cooling (° C.) | Cooling method | Cooling rate (° C./sec) | Overall heat-transfer coefficient during cooling [W/m$^2$K] | Remarks |
|---|---|---|---|---|---|---|---|
| (1) | (A) | 480 | 475 | Water immersion cooling | 800 | 2000 | Inventive Example |
| (2) | (A) | 460 | 475 | Water immersion cooling | 800 | 2000 | Inventive Example |
| (3) | (A) | 460 | 500 | Water immersion cooling | 840 | 2100 | Inventive Example |
| (4) | (A) | 460 | 520 | Water immersion cooling | 900 | 2400 | Inventive Example |
| (5) | (A) | 460 | 520 | Roll cooling + Air-water cooling | 400 | 850 | Comparative Example |
| (6) | (A) | 460 | 400 | Roll cooling + Air-water cooling | 350 | 600 | Comparative Example |
| (7) | (A) | 460 | 450 | Air-water cooling | 60 | 450 | Comparative Example |
| (8) | (A) | 460 | 475 | Air-water cooling | 60 | 470 | Comparative Example |
| (9) | (A) | 460 | 450 | Gas cooling | 40 | 280 | Comparative Example |
| (10) | (A) | 460 | 475 | Gas cooling | 40 | 320 | Comparative Example |
| (11) | (B) | 460 | 475 | Water immersion cooling | 800 | 2000 | Inventive Example |
| (12) | (C) | 540 | 475 | Water immersion cooling | 800 | 2000 | Comparative Example |
| (13) | (D) | 540 | 475 | Water immersion cooling | 800 | 2000 | Comparative Example |
| (14) | (E) | 460 | 475 | Water immersion cooling | 800 | 2000 | Comparative Example |
| (15) | (F) | 500 | 475 | Roll cooling + Air-water cooling | 350 | 600 | Comparative Example |
| (16) | (A) | 460 | 475 | Roll cooling | 90 | 520 | Comparative Example |
| (17) | (A) | 480 | 450 | Water immersion cooling | 760 | 1600 | Comparative Example |
| (18) | (A) | 460 | 520 | Roll intensive cooling + Air-water cooling | 520 | 900 | Comparative Example |
| (19) | (A) | 460 | 520 | Water immersion cooling (low water temperature, in-water spray) | 920 | 3100 | Comparative Example |

TABLE 4-continued

| Coated steel sheet No. | Plating bath No. | Plating bath temperature (° C.) | Temperature before cooling (° C.) | Cooling method | Cooling rate (° C./sec) | Overall heat-transfer coefficient during cooling [W/m²K] | Remarks |
|---|---|---|---|---|---|---|---|
| (20) | (A) | 460 | 460 | Water immersion cooling (high water temperature) | 490 | 1250 | Comparative Example |
| (21) | (G) | 460 | 530 | Water immersion cooling | 890 | 2300 | Comparative Example |

TABLE 5

| | Al primary crystal | | | | Component element content in structure | | | | | | |
|---|---|---|---|---|---|---|---|---|---|---|---|
| Coated steel sheet No. | Area rate of first Al primary crystal | Total area rate of second and third Al primary crystals | Area rate of Al primary crystal with another shape | Substance constitution of structure other than Al primary crystal | (Maximum value − Mean value)/ Mean value × 100 | | | | Maximum value Si % by mass | Corrosion weight loss g/m² | Remarks |
| | | | | | Zn % | Al % | Mg % | | | | |
| (1) | 62 | 30 | 8 | Al, Zn, Mg₂Zn₁₁, Si | 19 | 72 | 30 | | 0.15 | A | Inventive Example |
| (2) | 64 | 31 | 5 | Al, Zn, Mg₂Zn₁₁, Si | 17 | 72 | 30 | | 0.20 | A | Inventive Example |
| (3) | 65 | 30 | 5 | Al, Zn, Mg₂Zn₁₁, Si | 15 | 65 | 35 | | 0.15 | A | Inventive Example |
| (4) | 67 | 32 | 1 | Al, Zn, Mg₂Z₁₁, Si | 12 | 58 | 22 | | 0.20 | A | Inventive Example |
| (5) | 58 | 25 | 17 | Al, Zn, Mg₂Zn₁₁, Si (Trace amount of MgZn₂) | 19 | 74 | 59 | | 0.20 | B | Comparative Example |
| (6) | 8 | 2 | 90 | Al, Zn, Si, MgZn₂ | 30 | 105 | 120 | | 0.20 | C | Comparative Example |
| (7) | 0 | 7 | 93 | Al, Zn, Mg₂Zn₁₁, Si, Mg₂Si (Small amount of MgZn₂) | 26 | 94 | 100 | | 0.25 | A | Comparative Example |
| (8) | 0 | 8 | 92 | Al, Zn, Mg₂Zn₁₁, Si, Mg₂Si (Small amount of MgZn₂) | 25 | 95 | 95 | | 0.30 | A | Comparative Example |
| (9) | 1 | 4 | 95 | Al, Zn, Mg₂Zn₁₁, MgZn₂, Si, Mg₂Si | 55 | 102 | 114 | | 0.35 | A | Comparative Example |
| (10) | 0 | 1 | 99 | Al, Zn, MgZn₂, Si, Mg₂Si (Small amount of Mg₂Zn₁₁) | 57 | 110 | 105 | | 0.25 | C | Comparative Example |

TABLE 6

| | Al primary crystal | | | | Component element content in structure | | | | | | |
|---|---|---|---|---|---|---|---|---|---|---|---|
| Coated steel sheet No. | Area rate of first Al primary crystal | Total area rate of second and third Al primary crystals | Area rate of Al primary crystal with another shape | Substance constitution of structure other than Al primary crystal | (Maximum value − Mean value)/ Mean value × 100 | | | | Maximum value Si % by mass | Corrosion weight loss g/m² | Remarks |
| | | | | | Zn % | Al % | Mg % | | | | |
| (11) | 66 | 30 | 4 | Al, Zn, Mg₂Zn₁₁, Si | 17 | 70 | 30 | | 0.20 | A | Inventive Example |
| (12) | 38 | 38 | 24 | Al, Zn, Si, MgZn₂ | 25 | 63 | 46 | | 0.20 | B | Comparative Example |
| (13) | 12 | 15 | 73 | Al, Zn, Si, MgZn₂ * Initial precipitate is MgZn₂ | 25 | 88 | 25 | | 0.30 | C | Comparative Example |
| (14) | 51 | 29 | 20 | Al, Zn, Si, Mg₂Zn₁₁, MgZn₂ | 21 | 81 | 32 | | 0.20 | B | Comparative Example |
| (15) | 39 | 26 | 35 | Al, Zn, Mg₂Zn₁₁, Si (Trace amount of MgZn₂) | 22 | 77 | 78 | | 0.20 | B | Comparative Example |
| (16) | 11 | 3 | 86 | Al, Zn, MgZn₂, Si | 31 | 100 | 111 | | 0.25 | C | Comparative Example |
| (17) | 62 | 28 | 10 | Al, Zn, Mg₂Zn₁₁, Si (Trace amount of MgZn₂) | 18 | 72 | 35 | | 0.20 | B | Comparative Example |
| (18) | 59 | 27 | 14 | Al, Zn, Mg₂Zn₁₁, Si (Trace amount of MgZn₂) | 19 | 75 | 44 | | 0.25 | B | Comparative Example |
| (19) | 71 | 22 | 7 | Al, Zn, Mg₂Zn₁₁, Si, amorphous | 10 | 52 | 15 | | 0.20 | B | Comparative Example |

TABLE 6-continued

| | Al primary crystal | | | | Component element content in structure | | | | | |
| --- | --- | --- | --- | --- | --- | --- | --- | --- | --- | --- |
| Coated steel sheet No. | Area rate of first Al primary crystal | Total area rate of second and third Al primary crystals | Area rate of Al primary crystal with another shape | Substance constitution of structure other than Al primary crystal | (Maximum value – Mean value)/ Mean value × 100 | | | | Corrosion weight loss g/m² | Remarks |
| | | | | | Zn % | Al % | Mg % | Si % by mass | Maximum value | |
| (20) | 18 | 72 | 10 | Al, Zn, Mg$_2$Zn$_{11}$, Si | 21 | 75 | 26 | 0.20 | B | Comparative Example |
| (21) | 45 | 28 | 27 | Al, Zn, Si, MgZn$_2$ | 24 | 66 | 46 | 0.20 | B | Comparative Example |

The full meanings of abbreviations in Table 5 and Table 6 are as follows.

First Al primary crystal (cellular dendrite Al primary crystal): A cellular dendrite-shaped Al primary crystal with a second axis spacing of from 0.5 to 2.0 μm Second Al primary crystal (minute equi-axed dendrite Al primary crystal): A minute equi-axed dendrite-shaped Al primary crystal with a principal axis length of from 5 to 10 μm, and a second axis spacing of from 0.5 to 2.0 μm Third Al primary crystal (petal-shaped Al primary crystal): A petal-shaped Al primary crystal with a principal axis length of from 0.5 to 3.0 μm Al primary crystal with another shape: An Al primary crystal other than the above the cellular dendrite Al primary crystal, minute equi-axed dendrite primary crystal, and petal-shaped Al primary crystal.

From the results in Table 6 with respect to the coated steel sheets of No. 1 to No. 5, and No. 11, when a structure of a plated layer with predetermined components includes an Al primary crystal containing in terms of area rate 30 to 70% of a cellular dendrite Al primary crystal, and in terms of total area rate 30 to 70% of a minute equi-axed dendrite Al primary crystal and a petal-shaped Al primary crystal, and a structure other than an Al primary crystal is constituted with a ternary eutectic structure of Al, Zn, and Mg$_2$Zn$_{11}$, it is obvious that corrosion resistance is high, and the corrosion resistance is maintained stably.

With respect to plated layers of the coated steel sheets of No. 1 to No. 5, and No. 11, as an Al primary crystal with another shape a blocky Al primary crystal was observed. Further, it was confirmed that Mg$_2$Si was not contained in the plated layers.

On the other hand, it was clear that the coated steel sheets of No. 6 to No. 10, and No. 12 to No. 21, which did not satisfy the conditions for an Al primary crystal, did not exhibit sufficient corrosion resistance. With respect to plated layers of the coated steel sheets of No. 6 to No. 10, as an Al primary crystal with another shape an equi-axed structure Al primary crystal with a principal axis length of from 50 to 200 μm, and a second axis spacing of from 5 to 20 μm was observed. Further, it was confirmed that Mg$_2$Si was not contained in the plated layers.

The above suggests possibility that nonexistence of the Mg$_2$Si structure according to the invention is closely related to formation of a cellular dendrite Al primary crystal, a minute equi-axed dendrite Al primary crystal, and a petal-shaped Al primary crystal as the Al primary crystal in the structure according to the invention. It is conceivable that this is caused by deviation from an equilibrium state due to an increased overall heat-transfer coefficient in contrast to a conventional structure formation based on an equilibrium state.

The invention has been described in detail but the technical scope of the present disclosure is not limited to the above examples. A person skilled in the art can obviously find various alterations and modifications within the scope of the technical ideas in the appended claims, and it should be understood that they will naturally come under the technical scope of the present disclosure.

Further, according to the invention in producing a coated steel sheet, even when a posttreatment after plating is performed, the effect that corrosion resistance is superior, and the corrosion resistance can be maintained stably may be achieved identically. Further, according to the invention, even after a processing such as press molding is applied to a coated steel sheet, the plated layer of the coated steel sheet can keep its fine and nearly homogeneous structure, and therefore powdering occurs hardly, and the corrosion resistance is not decreased.

Examples of a posttreatment after plating include various treatments of a surface of a coated steel sheet, such as a treatment for forming an upper coating, a chromate treatment, a non-chromate treatment, a phosphate treatment, a lubrication improvement treatment, and a weldability improvement treatment. Examples of a posttreatment after plating include also a treatment for forming a paint film by coating a resin-based paint (such as polyester resin-based, acrylic resin-based, fluorocarbon resin-based, vinyl chloride resin-based, urethane resin-based, and epoxy resin-based paint) by a method, such as roll painting, spray painting, curtain flow coating, dip coating, and a film lamination method (for example, a film lamination method of laminating a resin film such as an acrylic resin film).

INDUSTRIAL APPLICABILITY

The invention is able to provide a Zn—A—Mg coated steel sheet, which is superior in corrosion resistance, and able to maintain stably the corrosion resistance. In this way, household electrical appliances and building materials superior in an anticorrosive property can come into wider uses. Since this suits the convenience of consumers, industrial values of the invention is extremely high.

The invention claimed is:

1. A Zn—Al—Mg coated steel sheet, comprising a plated layer comprising from 4 to 22% by mass of Al, from 1.0 to 6.5% by mass of Mg wherein Mg is ½ or less of Al in terms of % by mass, from 0.001 to 1.000% by mass of Si, and Zn and impurities as the balance, wherein the structure of the plated layer comprises:
an Al primary crystal, the Al primary crystal comprising: a cellular dendrite-shaped first Al primary crystal with an area rate of from 30 to 70% and a second axis spacing of from 0.5 to 2.0 µm; a minute equi-axed dendrite-shaped second Al primary crystal with a principal axis length of from 5 to 10 µm and a second axis spacing of from 0.5 to 2.0 µm; and a petal-shaped third Al primary crystal with a principal axis length of from 0.5 to 3.0 µm, wherein a total area rate of the minute equi-axed dendrite-shaped second Al primary crystal and the petal-shaped third Al primary crystal is from 30 to 70%, wherein the area rate of the Al primary crystal is determined from a surface of the plated layer; and a ternary eutectic structure of Al, Zn, and $Mg_2Zn_{11}$ as a structure other than the Al primary crystal.

2. The Zn—A—Mg coated steel sheet according to claim 1, wherein the plated layer further comprises one or more selected from Ti, Nb, Fe, Ni, Cr, Sn, Mn, or B, singly or as a complex in a total amount of from 0.0001 to 1.0000% by mass.

3. The Zn—A—Mg coated steel sheet according to claim 1, wherein the structure of the plated layer does not include $Mg_2Si$.

4. A method of producing a Zn—A—Mg coated steel sheet, the method comprising:

plating, on at least one side of a steel sheet, molten zinc comprising from 4 to 22% by mass of Al, from 1.0 to 6.5% by mass of Mg wherein Mg is ½ or less of Al in terms of % by mass, from 0.001 to 1.000% by mass of Si, and Zn and impurities as the balance, and heating the steel sheet plated with the molten zinc to any temperature of a range from 30° C. higher than a solidification initiation temperature of an Al primary crystal to 520° C., and then cooling to a temperature of 370° C. at a cooling rate of 500° C./sec or more, and securing an overall heat-transfer coefficient during cooling of from 1000 to 3000 W/($m^2$·K).

5. The method of producing a Zn—A—Mg coated steel sheet according to claim 4, wherein the cooling is performed by water immersion cooling.

* * * * *